United States Patent
Watanabe

(10) Patent No.: US 8,199,232 B2
(45) Date of Patent: Jun. 12, 2012

(54) AMPLIFICATION-TYPE SOLID-STATE IMAGE CAPTURING APPARATUS AND ELECTRONIC INFORMATION DEVICE

(75) Inventor: Takashi Watanabe, Kizugawa (JP)

(73) Assignee: Sharp Kabushiki Kaisha, Osaka (JP)

( * ) Notice: Subject to any disclaimer, the term of this patent is extended or adjusted under 35 U.S.C. 154(b) by 1042 days.

(21) Appl. No.: 12/009,094

(22) Filed: Jan. 16, 2008

(65) Prior Publication Data

US 2008/0180558 A1     Jul. 31, 2008

(30) Foreign Application Priority Data

Jan. 16, 2007    (JP) .................................... 2007-7489

(51) Int. Cl.
     *H04N 3/14*      (2006.01)
     *H04N 5/235*      (2006.01)

(52) U.S. Cl. ...................... 348/296; 348/230.1; 348/297

(58) Field of Classification Search ............... 348/221.1, 348/230.1, 227.1, 229.1, 231.99, 296, 312, 348/363, 297; 396/166–168
See application file for complete search history.

(56) References Cited

U.S. PATENT DOCUMENTS

| | | | | |
|---|---|---|---|---|
| 6,947,088 | B2 * | 9/2005 | Kochi | 348/308 |
| 7,244,920 | B2 * | 7/2007 | Kim et al. | 250/208.1 |
| 7,468,750 | B2 * | 12/2008 | Mabuchi et al. | 348/308 |
| 2001/0024238 | A1 * | 9/2001 | Fossum et al. | 348/295 |
| 2005/0110885 | A1 * | 5/2005 | Altice et al. | 348/308 |
| 2006/0061674 | A1 * | 3/2006 | Iida et al. | 348/308 |

\* cited by examiner

*Primary Examiner* — Lin Ye
*Assistant Examiner* — Euel Cowan
(74) *Attorney, Agent, or Firm* — David G. Conlin; Steven M. Jensen; Edwards Wildman Palmer LLP

(57) ABSTRACT

An amplification-type solid-state image capturing apparatus according to the present invention, having a plurality of pixel sections each including a photoelectric conversion element for receiving light of a subject and performing a photoelectric conversion on the light of the subject and a transfer section capable of transferring signal charge from the photoelectric conversion element to a charge detection section, the plurality of pixel sections connected to each charge detection section, and the amplification-type solid-state image capturing apparatus amplifying and reading potential at the charge detection section as signal data for each of the pixel sections, includes: when one of the plurality of pixel sections which share the charge detection section performs an original shutter operation, a shutter control section for performing an additional shutter operation on the remaining pixel sections which share the charge detection section with the one pixel section and have not performed the original shutter operation yet.

28 Claims, 10 Drawing Sheets

Sequential reading
1H shutter period (a)

| | 0th H | 1st H | 2nd H | 3rd H | 4th H |
|---|---|---|---|---|---|
| First row | S | R | S' | S' | S' |
| Second row | S' | S | R | S' | S' |
| Third row | S' | S' | S | R | S' |
| Fourth row | S' | S' | S' | S | R |
| Degree of overflow at the time of reading | | Small | Small | Small | Small |

2H shutter period (b)

| | 0th H | 1st H | 2nd H | 3rd H | 4th H | 5th H |
|---|---|---|---|---|---|---|
| First row | S | | R | S' | S' | S' |
| Second row | S' | S | | R | S' | S' |
| Third row | S' | S' | S | | R | S' |
| Fourth row | S' | S' | S' | S | | R |
| Degree of overflow at the time of reading | | | Small | Small | Small | Small |

3H shutter period (c)

| | 0th H | 1st H | 2nd H | 3rd H | 4th H | 5th H | 6th H |
|---|---|---|---|---|---|---|---|
| First row | S | | | R | S' | S' | S' |
| Second row | S' | S | | | R | S' | S' |
| Third row | S' | S' | S | | | R | S' |
| Fourth row | S' | S' | S' | S | | | R |
| Degree of overflow at the time of reading | | | | Small | Small | Small | Small |

FIG.2

S̄ Additional shutter (a) Sequential reading
1H shutter period

| | 0th H | 1st H | 2nd H | 3rd H | 4th H |
|---|---|---|---|---|---|
| First row | S' | R | S' | S' | S' |
| Second row | S' | S' | R | S' | S' |
| Third row | S' | S' | S' | R | S' |
| Fourth row | S' | S' | S' | S' | R |
| Degree of overflow at the time of reading | | Small | Small | Small | Small |

(b) 2H shutter period

| | 0th H | 1st H | 2nd H | 3rd H | 4th H | 5th H |
|---|---|---|---|---|---|---|
| First row | S' | | R | S' | S' | S' |
| Second row | S' | S' | | | R | S' |
| Third row | S' | S' | | S' | | R |
| Fourth row | S' | S' | S' | | | |
| Degree of overflow at the time of reading | | | Small | Small | Small | Small |

(c) 3H shutter period

| | 0th H | 1st H | 2nd H | 3rd H | 4th H | 5th H | 6th H |
|---|---|---|---|---|---|---|---|
| First row | S' | | | R | S' | S' | S' |
| Second row | S' | S' | | | R | S' | S' |
| Third row | S' | S' | S' | | | R | S' |
| Fourth row | S' | S' | S' | S' | | | R |
| Degree of overflow at the time of reading | | | | Small | Small | Small | Small |

FIG.4
(a)
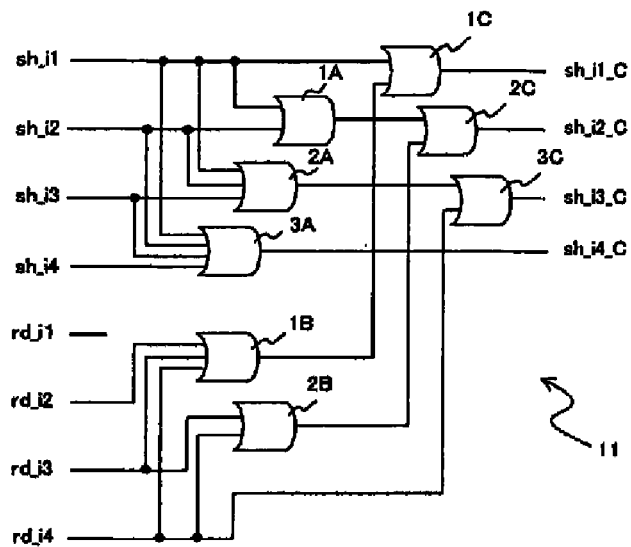
(b)
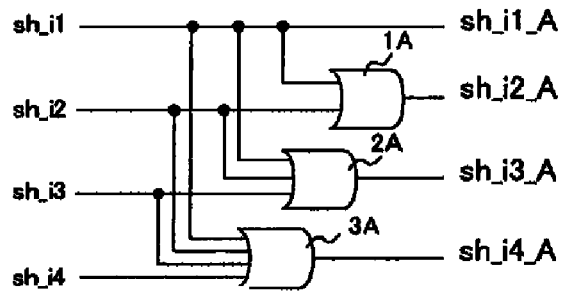
(c)
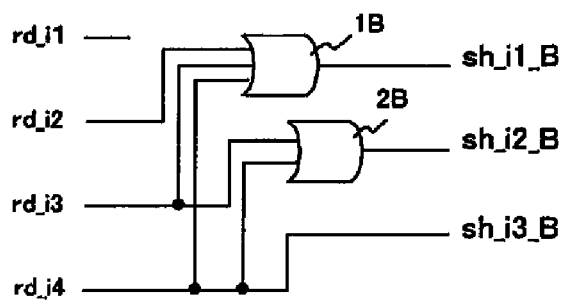

FiG.5

(a) Non-sequential reading
1H shutter period

| | 0th H | 1st H | 2nd H | 3rd H | 4th H |
|---|---|---|---|---|---|
| First row | S | R | S' | S' | S' |
| Second row | S' | S' | S' | R | S' |
| Third row | S' | S' | R | S' | S' |
| Fourth row | S' | S' | S' | S' | R |
| Degree of overflow at the time of reading | | Small | Small | Small | Small |

(b) 1H shutter period

| | 0th H | 1st H | 2nd H | 3rd H | 4th H | 5th H |
|---|---|---|---|---|---|---|
| First row | S | R | | S' | S' | S' |
| Second row | S' | S' | S' | S' | R | S' |
| Third row | S' | S' | R | S' | S' | S' |
| Fourth row | S' | S' | S' | S' | S' | R |
| Degree of overflow at the time of reading | | Small | Small | Small | Small | Small |

FIG.9

S: Shutter operation
R: Reading operation (a) 1H shutter period

| | 0th H | 1st H | 2nd H | 3rd H | 4th H | Overflowed pixel section |
|---|---|---|---|---|---|---|
| First row | S | R | | | | |
| Second row | | S | R | | | |
| Third row | | | S | R | | |
| Fourth row | | | S | S | R | |
| Degree of overflow at the time of reading | | Large | Moderate | Small | Small~Moderate | |

(b) 2H shutter period

| | 0th H | 1st H | 2nd H | 3rd H | 4th H | 5th H |
|---|---|---|---|---|---|---|
| First row | S | | R | | | |
| Second row | | S | | R | | |
| Third row | | | S | | R | |
| Fourth row | | | S | S | | R |
| Degree of overflow at the time of reading | | | Moderate | Small | Small | Small~Moderate |

AMPLIFICATION-TYPE SOLID-STATE IMAGE CAPTURING APPARATUS AND ELECTRONIC INFORMATION DEVICE

This Nonprovisional application claims priority under 35 U.S.C. §119(a) on Patent Application No. 2007-007489 filed in Japan on Jan. 16, 2007, the entire contents of which are hereby incorporated by reference.

BACKGROUND OF THE INVENTION

1. Field of the Invention

The present invention relates to: an amplification-type solid-state image capturing apparatus having an amplification function for amplifying and reading signal charge, into which light of a subject is photoelectrically converted by a photoelectric conversion element; and an electronic information device using the amplification-type solid-state image capturing apparatus for an image capturing section thereof, and in particular, the present invention relates to: an amplification-type solid-state image capturing apparatus, in which a charge detection section is shared by a plurality of pixel sections; and an electronic information device (e.g., digital camera (digital video camera, digital still camera), image input camera, scanner, facsimile, cell phone device equipped with camera and the like) using the amplification-type solid-state image capturing apparatus as an image input device for an image capturing section thereof.

2. Description of the Related Art

Generally, as a conventional amplification-type solid-state image capturing apparatus, an amplification-type solid-state image capturing apparatus is widely used, which includes a pixel section having a function for amplifying signal charge and a scan circuit arranged around the pixel section, and which is configured to read pixel data from the pixel section by the scan circuit.

As an example of such an amplification-type solid-state image capturing apparatus, an APS (Active Pixel Sensor) image sensor is known, which is configured by a CMOS (Complementary Metal Oxide Semiconductor). As a common CMOS APS image sensor, a three-transistor type or four-transistor type CMOS APS image sensor having a predetermined number of transistors in each pixel is known. Among them, a four-transistor type CMOS APS image sensor which can obtain a high quality image has been recently becoming a mainstream.

Hereinafter, an exemplary structure of a pixel section in a conventional four-transistor type APS image sensor will be described in detail with reference to FIG. 7.

FIG. 7 is a circuit diagram showing an exemplary structure of a pixel section in a four-transistor type APS image sensor including four MOS transistors in the pixel section.

In FIG. 7, each pixel section in the conventional APS image sensor includes: a photoelectric conversion element PD; a transfer transistor T1 for transferring signal charge from the photoelectric conversion element PD to a charge detection section FD; an amplification transistor T2 for amplifying and reading potential at the charge detection section FD; a reset transistor T3 for resetting the potential at the charge detection section FD to a power supply voltage Vdd; and a selection transistor T4 for selectively reading an output from the amplification transistor T2 to a reading signal line SIG.

The transfer transistor T1 is connected between the photoelectric conversion element PD and the charge detection section FD. A gate of the transfer transistor T1 is connected to a transfer transistor drive line TX.

The amplification transistor T2 is connected between the power supply voltage Vdd and the selection transistor T4. A gate of the amplification transistor T2 is connected to the charge detection section FD.

The reset transistor T3 is connected between the power supply voltage Vdd and the charge detection section FD. A gate of the reset transistor T3 is connected to a reset transistor drive line RST.

The selection transistor T4 is connected between the amplification transistor T2 and the reading signal line SIG. A gate of the selection transistor T4 is connected to a selection transistor drive line SEL.

The reading signal line SIG is connected to a ground voltage end via a load transistor T5. A plurality of pixel sections is arranged in a matrix, and a plurality of reading signal lines SIG is provided in one direction.

The photoelectric conversion element PD is a light receiving section, and it is generally configured by an embedded photodiode and generates signal charge in accordance with an amount of incident light from an external subject.

With the structure described above, signal charge which has been photoelectrically converted by the photoelectric conversion element PD is transferred by the transfer transistor T1 from the photoelectric conversion element PD to the charge detection section FD.

At the charge detection section FD, prior to the transfer of signal charge from the photoelectric conversion element PD to the charge detection section FD, the potential at the charge detection section FD is reset to the power supply voltage Vdd by the reset transistor T3. Then, the transfer transistor T1 is placed on an on-state, and the signal charge is transferred from the photoelectric conversion element PD to the charge detection section FD.

Subsequent to the transfer of signal charge after the resetting, the potential at the charge detection section FD is amplified by the amplification transistor T2. The amplified potential is read as signal to the reading signal line SIG via the selection transistor T4. The read amplified potential is received by the load transistor T5 connected to the end of the reading signal line SIG so as to output a signal Vout.

A structure of one pixel section in the conventional amplification-type solid-state image capturing apparatus shown in FIG. 7 requires a plurality of transistors in the one pixel section. Therefore, it is difficult to reduce the size of a pixel. As such, a method is proposed, in which the average number of transistors in one pixel section is reduced by sharing transistors in the one pixel section by a plurality of photoelectric conversion elements.

As an example, Reference 1 proposes an amplification-type solid-state image capturing apparatus in which a charge detection section FD is shared by four photoelectric conversion elements PD adjacent to each other in a vertical direction.

Hereinafter, an exemplary structure of a pixel section in a conventional four-transistor type APS image sensor disclosed in Reference 1 will be described in detail with reference to FIG. 8.

FIG. 8 is a circuit diagram showing an exemplary structure of a pixel section in a conventional four-transistor type APS image sensor disclosed in Reference 1.

In the conventional APS image sensor in FIG. 8, four pixel sections are used as one unit, and each four-pixel section includes: four photoelectric conversion elements PD-1 to PD-4 adjacent to each other in a vertical direction; transfer transistors T1-1 to T1-4 each forming a pair with corresponding one of the photoelectric conversion elements PD-1 to PD-4; a charge detection section FD connected to an end of each of the transfer transistors T1-1 to T1-4 which is not connected to each of the respective photoelectric conversion elements PD-1 to PD-4; a reset transistor T3 for resetting potential at the charge detection section FD to a power supply voltage Vdd; an amplification transistor T2 for amplifying the potential at the charge detection section FD; a selection transistor T4 for selectively reading an output from the amplification transistor T2 to a reading signal line SIG.

With the structure described above, first, the reset transistor T3 is placed on an on-state, and the potential at the charge detection section FD is reset to the power supply voltage Vdd.

Then, the transfer transistor T1-1 located at the top is placed on an on-state, and signal charge is transferred from the photoelectric conversion element PD-1 to the charge detection section FD. The potential at the charge detection section FD having the difference resulting from before and after the operation of transferring signal charge is then amplified by the amplification transistor T2. Then, the amplified potential is read to the reading signal line SIG via the selection transistor T4.

Similarly, an operation of transferring signal charge to the charge detection section FD, an operation of amplifying the potential at the charge detection section FD having the difference resulting from before and after the operation of transferring signal charge and an operation of reading the amplified potential (signal) to the reading signal line SIG are subsequently performed for each of the photoelectric conversion element PD-2 located second from the top, the photoelectric conversion element PD-3 located third from the top and the photoelectric conversion element PD-4 located fourth from the top.

Next, the signal charge read to the reading signal line SIG is received by the load transistor T5 connected to the end of the reading signal line SIG so as to output a signal Vout.

Reference 1: Japanese Laid-Open Publication No. 2006-222427

SUMMARY OF THE INVENTION

As described above, in order to reduce the size of a pixel, it is effective to connect a plurality of photoelectric conversion elements PD to a shared charge detection section FD via respective transfer transistors T1, and to share the charge detection section FD, the amplification transistor T2, the reset transistor T3, the selection transistor T4 and the like by a plurality of pixel sections.

However, such a structure of sharing a single charge detection section FD by a plurality of pixel sections has the following problems.

The response of the solid-state image capturing apparatus when strong incident light is received at the photoelectric conversion elements PD for FIG. 8 will be considered. A captured image will be described in which a shutter period (optical charge accumulation period shortened by a shutter operation in the case of strong incident light) is one horizontal scan period (1H), as a method for shortening the period by a shutter operation for accumulating optical charge at the photoelectric conversion elements PD when strong incident light is received at the photoelectric conversion elements PD, as shown in Portion (a) of FIG. 9.

Portion (a) of FIG. 9 is a timing diagram for describing an operation of the amplification-type solid-state image capturing apparatus when a shutter period (optical charge accumulation period shortened by a shutter operation in the case of strong incident light) is one horizontal scan period (1H). In Portion (a) of FIG. 9, S indicates a shutter operation, R indicates a reading operation, and a portion in black indicates a pixel section having overflowed charge.

When incident light is sufficiently strong, signal charge exceeds a capacity limit to be accumulated at the photoelectric conversion elements PD. Therefore, the signal charge overflows from the photoelectric conversion elements PD to the charge detection section FD side via the respective transfer transistors T1, and thus an overflow phenomenon occurs. As such, between the reset level reading period and the signal level reading period of a currently-read pixel section, overflowed charge flows from not-currently-read pixel sections into the charge detection section FD, and disrupts original image information.

In the structure of the conventional amplification-type solid-state image capturing apparatus shown in FIG. 8, a single charge detection section FD is shared by four photoelectric conversion elements PD-1 to PD-4. In the 1st H period when a reading operation R is performed on a pixel section at the first row, the photoelectric conversion element PD-1 has signal charge accumulated for 1H period (0th H period) subsequent to the shutter operation S, the photoelectric conversion element PD-2 does not overflow since it has just performed the shutter operation S, yet the remaining two photoelectric conversion elements PD-3 and PD-4 each have signal charge accumulated for 1H period (0th H period), and thus an overflow occurs, thereby affecting the reading operation R of the pixel section at the first row. More specifically, between the reading of the reset level prior to the transfer of signal charge and the reading of the signal level subsequent to the transfer of signal charge, the overflowed charge (degree of overflow is "large") is added to an original signal. As a result, the display of the captured image has a whitened appearance.

Next, in the 2nd H period when a reading operation R is performed on a pixel section at the second row, the photoelectric conversion element PD-1 performed the reading operation R 1H earlier, the photoelectric conversion element PD-2 has signal charge accumulated for 1H period (1st H period) subsequent to the shutter operation S, the photoelectric conversion element PD-3 does not overflow since it has just performed the shutter operation S, yet the remaining photoelectric conversion element PD-4 has signal charge accumulated for 1H period (1st H period), and thus it overflows. Therefore, when the reading operation R is performed on the pixel section at the second row, the overflowed charge (degree of overflow is "moderate") is added to an original signal between the reading of the reset level prior to the transfer of signal charge and the reading of the signal level subsequent to the transfer of signal charge. As a result, the display of the captured image has a whitened appearance. However, when the reading operation R is performed on the pixel section at the second row, the amount of white color is halved compared to the case when the reading operation R is performed on the pixel section at the first row.

Further, in the 3rd H period when a reading operation R is performed on a pixel section at the third row, the photoelectric conversion element PD-1 performed the reading operation R 2H earlier, the photoelectric conversion element PD-2 performed the reading operation R 1H earlier, the photoelectric conversion element PD-3 has signal charge accumulated for 1H period (2nd H period) subsequent to the shutter operation S, and the photoelectric conversion element PD-4 does not overflow since it has just performed the shutter operation S. Therefore, when the reading operation R is performed on the pixel section at the third row, the degree of overflow between the reading of the reset level prior to the transfer of signal charge and the reading of the signal level subsequent to the transfer of signal charge is "small". As a result, the display does not have a whitened appearance in an original signal.

Further, in the 4th H period when a reading operation R is performed on a pixel section at the fourth row, the photoelectric conversion element PD-1 performed the reading operation R 3H earlier, the photoelectric conversion element PD-2 performed the reading operation R 2H earlier, the photoelectric conversion element PD-3 performed the reading operation R 1H earlier, and the photoelectric conversion element PD-4 has signal charge accumulated for 1H period (3rd H period) subsequent to the shutter operation S. Therefore, except the case of extremely large amount of incident light, when the reading operation R is performed on the pixel section at the fourth row, the degree of overflow between the reading of the reset level prior to the transfer of signal charge and the reading of the signal level subsequent to the transfer of signal charge is "small". As a result, the display does not have a whitened appearance in an original signal. However, in the case of an extremely large amount of incident light, since the photoelectric conversion element PD-1 performed the reading operation R 3H earlier, the photoelectric conversion element PD-1 overflows. Thus, the degree of overflow becomes "moderate", and the display has a slight whitened appearance in an original signal.

The operations described above are repeated at a four-row cycle. Therefore, when a subject having high luminance is captured, a pattern of horizontal stripes at a four-row cycle is generated as shown in FIG. 10, and the image quality is significantly impaired.

Next, as another example, a captured image will be described in which a shutter period (optical charge accumulation period shortened by a shutter operation in the case of strong incident light) is two horizontal scan periods (2H), as shown in Portion (b) of FIG. 9.

Portion (b) of FIG. 9 is a timing diagram for describing an operation of the amplification-type solid-state image capturing apparatus when a shutter period (optical charge accumulation period shortened by a shutter operation) is two horizontal scan periods (2H).

In the structure of the conventional amplification-type solid-state image capturing apparatus shown in FIG. 8, a single charge detection section FD is shared by four photoelectric conversion elements PD-1 to PD-4. In the 2nd H period when a reading operation R is performed on a pixel section at the first row, the photoelectric conversion element PD-1 has signal charge accumulated for 2H periods (0th H period and 1st H period) subsequent to the shutter operation S, and the remaining two photoelectric conversion elements PD-3 and PD-4 each have signal charge accumulated for 2H periods (0th H period and 1st H period), and thus an overflow occurs. Therefore, when the reading operation R is performed on the pixel section at the first row, the overflowed charge (degree of overflow is "moderate") is added to an original signal between the reading of the reset level prior to the transfer of signal charge and the reading of the signal level subsequent to the transfer of signal charge. As a result, the display of the captured image has a whitened appearance.

Next, in the 3rd H period when a reading operation R is performed on a pixel section at the second row, the photoelectric conversion element PD-1 performed the reading operation R 1H earlier, the photoelectric conversion element PD-2 has signal charge accumulated for 2H periods (1st H period and 2nd H period) subsequent to the shutter operation S, and the photoelectric conversion element PD-4 does not overflow since it has just performed the shutter operation S (degree of overflow is "small"). Therefore, when the reading operation R is performed on the pixel section at the second row, the degree of overflow between the reading of the reset level prior to the transfer of signal charge and the reading of the signal level subsequent to the transfer of signal charge is "small". As a result, the display does not have a whitened appearance in an original signal.

Further, in the 4th H period when a reading operation R is performed on a pixel section at the third row, the photoelectric conversion element PD-1 performed the reading operation R 2H earlier, the photoelectric conversion element PD-2 performed the reading operation R 1H earlier, and the photoelectric conversion element PD-3 has signal charge accumulated for 2H periods (2nd H period and 3rd H period) subsequent to the shutter operation S. Therefore, when the reading operation R is performed on the pixel section at the third row, the degree of overflow between the reading of the reset level prior to the transfer of signal charge and the reading of the signal level subsequent to the transfer of signal charge is "small". As a result, the display does not have a whitened appearance in an original signal.

Further, in the 5th H period when a reading operation R is performed on a pixel section at the fourth row, the photoelectric conversion element PD-1 performed the reading operation R 3H earlier, the photoelectric conversion element PD-2 performed the reading operation R 2H earlier, the photoelectric conversion element PD-3 performed the reading operation R 1H earlier, and the photoelectric conversion element PD-4 has signal charge accumulated for 2H periods (3rd H period and 4th H period) subsequent to the shutter operation S. Therefore, except the case of an extremely large amount of incident light, when the reading operation R is performed on the pixel section at the fourth row, the degree of overflow between the reading of the reset level prior to the transfer of signal charge and the reading of the signal level subsequent to the transfer of signal charge is "small". As a result, the display does not have a whitened appearance in an original signal. However, in the case of an extremely large amount of incident light, since the photoelectric conversion element PD-1 performed the reading operation R 3H earlier, the photoelectric conversion element PD-1 overflows. Thus, the degree of overflow becomes "moderate", and the display has a slight whitened appearance in an original signal.

As described above, even when a shutter period (optical charge accumulation period shortened by a shutter operation in the case of strong incident light) is two horizontal scan periods (2H) as shown in Portion (b) of FIG. 9, a similar overflow phenomenon occurs although the degree of overflow is somewhat reduced compared to the case when the shutter period is one horizontal scan period (1H) shown in Portion (a) of FIG. 9.

The degree of disruption of image information (amount of overflow) by the overflowed charge described above becomes maximum when a reading operation R is performed on a first pixel section of the plurality pixel sections sharing the charge detection section FD. The reason for this is because signal charge from the remaining pixel sections overflows. While the reading operation R is performed, the amount of overflow is sequentially decreased since signal charge at a pixel section is reset by the reading operation R. Therefore, an image has a pattern of horizontal stripes at a cycle of the sharing number of pixel sections, which significantly impairs the image quality. Further, when an amount of incident light is large, the charge detection section FD for a pixel section which has performed the reading operation R again accumulates signal charge overtime and starts overflowing via a transfer transistor T1. The pattern of horizontal stripes depends on an amount of light, and it is difficult to solve such a problem.

The present invention is intended to solve the conventional problems described above. The objective of the present invention is to provide: an amplification-type solid-state image capturing apparatus capable of suppressing the generation of a pattern of horizontal stripes due to blooming by the pixel sections other than the currently-read pixel section when a subject having high luminance is captured, in which signal charge from a plurality of photoelectric conversion elements is transferred to a shared charge detection section; and an electronic information device using the amplification-type solid-state image capturing apparatus for an image capturing section thereof.

An amplification-type solid-state image capturing apparatus according to the present invention, having a plurality of pixel sections each including a photoelectric conversion element for receiving light of a subject and performing a photoelectric conversion on the light of the subject and a transfer section capable of transferring signal charge from the photoelectric conversion element to a charge detection section, the plurality of pixel sections connected to each charge detection section, and the amplification-type solid-state image capturing apparatus amplifying and reading potential at the charge detection section as signal data for each of the pixel sections, includes: when one of the plurality of pixel sections which share the charge detection section performs an original shutter operation, a shutter control section for performing an additional shutter operation on the remaining pixel sections which share the charge detection section with the one pixel section and have not performed the original shutter operation yet, thereby the objective described above being achieved.

Preferably, in an amplification-type solid-state image capturing apparatus according to the present invention, when one of the plurality of pixel sections which share the charge detection section performs a reading operation, the shutter control section performs the additional shutter operation on the remaining pixel sections which share the charge detection section with the one pixel section and have previously performed the reading operation.

An amplification-type solid-state image capturing apparatus according to the present invention, having a plurality of pixel sections each including a photoelectric conversion element for receiving light of a subject and performing a photoelectric conversion on the light of the subject and a transfer section capable of transferring signal charge from the photoelectric conversion element to a charge detection section, the plurality of pixel sections connected to each charge detection section, and the amplification-type solid-state image capturing apparatus amplifying and reading potential at the charge detection section as signal data for each of the pixel sections, includes: when one of the plurality of pixel sections which share the charge detection section performs a reading operation, a shutter control section for performing an additional shutter operation on the remaining pixel sections which share the charge detection section with the one pixel section and have previously performed the reading operation, wherein the additional shutter operation is different from an original shutter operation for instructing the start of an optical charge accumulation period of the photoelectric conversion element, the objective described above being achieved.

Still preferably, in an amplification-type solid-state image capturing apparatus according to the present invention, the start of an optical charge accumulation period of each of the pixel sections is set by the original shutter operation, and the end of the optical charge accumulation period of each of the pixel sections is set by the reading operation.

Still preferably, in an amplification-type solid-state image capturing apparatus according to the present invention, a number of the plurality of pixel sections which share the charge detection section is N (N is an integer greater than or equal to 2), and the optical charge accumulation period is less than or equal to (N−1) of a multiple of a horizontal scan period.

Still preferably, in an amplification-type solid-state image capturing apparatus according to the present invention, a reset section for resetting the potential at the charge detection section when the signal data is read, and an amplification section for amplifying the potential at the charge detection section are provided for each charge detection section.

Still preferably, in an amplification-type solid-state image capturing apparatus according to the present invention, the reset section is a depression-type transistor.

Still preferably, in an amplification-type solid-state image capturing apparatus according to the present invention, the transfer section and the amplification section are each an enhancement-type transistor.

Still preferably, in an amplification-type solid-state image capturing apparatus according to the present invention, the photoelectric conversion element is an embedded photodiode.

Still preferably, in an amplification-type solid-state image capturing apparatus according to the present invention, a selection section for selectively reading an output from the amplification section as the signal data to a reading signal line is provided between the amplification section and the reading signal line or provided between the amplification section and a power supply.

Still preferably, in an amplification-type solid-state image capturing apparatus according to the present invention, the charge detection section is commonly connected to two to four pixel sections arranged to be adjacent to each other in a vertical direction.

Still preferably, in an amplification-type solid-state image capturing apparatus according to the present invention, a number of the plurality of pixel sections sharing the charge detection section is M (M is an integer greater than or equal to 2), and the shutter control section includes (M−1) number of OR circuits: a first OR circuit A, to which shutter control signals are input, wherein each of the shutter control signals controls an original shutter operation of corresponding one of two pixel sections among the plurality of pixel sections sharing the charge detection section, and the original shutter operation of each of the two pixel sections is performed at an earlier time; a second OR circuit A, to which shutter control signals are input, wherein each of the shutter control signals controls an original shutter operation of corresponding one of three pixel sections among the plurality of pixel sections sharing the charge detection section, and the original shutter operation of the three pixel sections is performed at an earlier time; . . . an (M−2)th OR circuit A, to which shutter control signals are input, wherein each of the shutter control signals controls an original shutter operation of corresponding one of (M−1) pixel sections among the plurality of pixel sections sharing the charge detection section, and the original shutter operation of each of the (M−1) pixel sections is performed at an earlier time; and an (M−1)th OR circuit A, to which shutter control signals are input, wherein each of the shutter control signals controls an original shutter operation of corresponding one of the plurality of pixel sections sharing the charge detection section, when one of the plurality of pixel sections which share the charge detection section performs an original shutter operation, in order to perform an additional shutter operation on the remaining pixel sections which share the charge detection section with the one pixel section and have not performed an original shutter operation yet, a pixel section, among the plurality of pixel sections sharing the charge detection section, which performs an original shutter operation at the earliest time is supplied with a shutter control signal for controlling a shutter period of the pixel section, a pixel section, among the plurality of pixel sections sharing the charge detection section, which performs an original shutter operation at the second earliest time is supplied with an output signal from the first OR circuit A, a pixel section, among the plurality of pixel sections sharing the charge detection section, which performs an original shutter operation at the third earliest time is supplied with an output signal from the second OR circuit A, . . . a pixel section, among the plurality of pixel sections sharing the charge detection section, which performs an original shutter operation at the (M−1)th earliest time is supplied with an output signal from the (M−2)th OR circuit A, and a pixel section, among the plurality of pixel sections sharing the charge detection section, which performs an original shutter operation at the latest time is supplied with an output signal from the (M−1)th OR circuit A.

Still preferably, in an amplification-type solid-state image capturing apparatus according to the present invention, a number of the plurality of pixel sections sharing the charge detection section is M (M is an integer greater than or equal to 2), and the shutter control section includes: (M−1) number of OR circuits A: a first OR circuit A, to which shutter control signals are input, wherein each of the shutter control signals controls an original shutter operation of corresponding one of two pixel sections among the plurality of pixel sections sharing the charge detection section, and the original shutter operation of each of the two pixel sections is performed at an earlier time; a second OR circuit A, to which shutter control signals are input, wherein each of the shutter control signals controls the original shutter operation of corresponding one of three pixel sections among the plurality of pixel sections sharing the charge detection section, and the original shutter operation of each of the three pixel sections is performed at an earlier time; . . . an (M−2)th OR circuit A, to which shutter control signals are input, wherein the shutter control signals controls the original shutter operation of corresponding one of (M−1) pixel sections among the plurality of pixel sections sharing the charge detection section, and the original shutter operation of each of the (M−1) pixel sections is performed at an earlier time; and an (M−1)th OR circuit A, to which shutter control signals are input, wherein each of the shutter control signals controls the original shutter operation of corresponding one of the plurality of pixel sections sharing the charge detection section; (M−2) number of OR circuits B: a first OR circuit B, to which reading control signals are input, wherein each of the reading control signals controls a reading operation of corresponding one of (M−1) pixel sections among the plurality of pixel sections sharing the charge detection section, and the reading operation of each of the (M−1) pixel sections is performed at a later time; a second OR circuit B, to which reading control signals are input, wherein each of the reading control signals controls a reading operation of corresponding one of (M−2) pixel sections among the plurality of pixel sections sharing the charge detection section, and the reading operation of each of the (M−2) pixel sections is performed at a later time; . . . an (M−3)th OR circuit B, to which reading control signals are input, wherein each of the reading control signals controls a reading operation of corresponding one of three pixel sections among the plurality of pixel sections sharing the charge detection section, and the reading operation of each of the three pixel sections is performed at a later time; and an (M−2)th OR circuit B, to which reading control signals are input, wherein each of the reading control signals controls a reading operation of corresponding one of two pixel sections among the plurality of pixel sections sharing the charge detection section, and the reading operation of each of the two pixel sections is performed at a later time; and (M−1) number of OR circuits C: a first OR circuit C, to which a shutter control signal and an output signal from the first OR circuit B are input, wherein the shutter control signal controls an original shutter operation of a pixel section among the plurality of pixel sections sharing the charge detection section, and the original shutter operation of the pixel section is performed at the earliest time; a second OR circuit C, to which an output signal from the first OR circuit A and an output signal from the second OR circuit B are input; . . . an (M−2)th OR circuit C, to which an output signal from the (M−3)th OR circuit A and an output signal from the (M−2)th OR circuit B are input; and an (M−1)th OR circuit C, to which an output signal from the (M−2)th OR circuit A and a reading control signal are input, wherein the reading control signal controls a reading operation of a pixel section among the plurality of pixel sections sharing the charge detection section, and the reading operation of the pixel section is performed at the latest time, when one of the plurality of pixel sections which share the charge detection section performs an original shutter operation, in order to perform an additional shutter operation on the remaining pixel sections which share the charge detection section with the one pixel section and have not performed the original shutter operation yet, and when one of the plurality of pixel sections which share the charge detection section performs a reading operation, in order to perform an additional shutter operation on the remaining pixel sections which share the charge detection section with the one pixel section and have previously performed a reading operation, a pixel section, among the plurality of pixel sections sharing the charge detection section, which performs a reading operation at the earliest time is supplied with an output signal from the first OR circuit C, a pixel section, among the plurality of pixel sections sharing the charge detection section, which performs a reading operation at the second earliest time is supplied with an output signal from the second OR circuit C, . . . a pixel section, among the plurality of pixel sections sharing the charge detection section, which performs a reading operation at the (M−2)th earliest time is supplied with an output signal from the (M−2)th OR circuit C, a pixel section, among the plurality of pixel sections sharing the charge detection section, which performs a reading operation at the (M−1)th earliest time is supplied with an output signal from the (M−1)th OR circuit C, a pixel section, among the plurality of pixel sections sharing the charge detection section, which performs a reading operation at the latest time is supplied with an output signal from the (M−1)th OR circuit A.

Still preferably, in an amplification-type solid-state image capturing apparatus according to the present invention, a number of the plurality of pixel sections sharing the charge detection section is M (M is an integer greater than or equal to 2), and the shutter control section includes: (M−2) number of OR circuits B: a first OR circuit B, to which reading control signals are input, wherein each of the reading control signals controls a reading operation of corresponding one of (M−1) pixel sections among the plurality of pixel sections sharing the charge detection section, and the reading operation of each of the (M−1) pixel sections is performed at a later time; a second OR circuit B, to which reading control signals are input, wherein each of the reading control signals controls a reading operation of corresponding one of (M−2) pixel sections among the plurality of pixel sections sharing the charge detection section, and the reading operation of each of the (M−2) pixel sections is performed at a later time; . . . an (M−3)th OR circuit B, to which reading control signals are input, wherein each of the reading control signals controls a reading operation of corresponding one of three pixel sections among the plurality of pixel sections sharing the charge detection section, and the reading operation of each of the three pixel sections is performed at a later time; and an (M−2)th OR circuit B, to which reading control signals are input, wherein each of the reading control signals controls a reading operation of corresponding one of two pixel sections among the plurality of pixel sections sharing the charge detection section, and the reading operation of each of the two pixel sections is performed at a later time, when one of the plurality of pixel sections which share the charge detection section performs a reading operation, in order to perform an additional shutter operation on the remaining pixel sections which share the charge detection section with the one pixel section and have previously performed the reading operation, a pixel section, among the plurality of pixel sections sharing the charge detection section, which performs a reading operation at the earliest time is supplied with an output signal from the first OR circuit B, a pixel section, among the plurality of pixel sections sharing the charge detection section, which performs a reading operation at the second earliest time is supplied with an output signal from the second OR circuit B, . . . a pixel section, among the plurality of pixel sections sharing the charge detection section, which performs a reading operation at the (M−3)th earliest time is supplied with an output signal from the (M−3)th OR circuit B, a pixel section, among the plurality of pixel sections sharing the charge detection section, which performs a reading operation at the (M−2)th earliest time is supplied with an output signal from the (M−2)th OR circuit B, a pixel section, among the plurality of pixel sections sharing the charge detection section, which performs a reading operation at the (M−1)th earliest time is supplied with a reading control signal for controlling a pixel section that performs a reading operation at the latest time.

Still preferably, in an amplification-type solid-state image capturing apparatus according to the present invention, a number of the plurality of pixel sections sharing the charge detection section is 4, and the shutter control section includes: three OR circuits A: a first OR circuit A, to which shutter control signals are input, wherein each of the shutter control signals controls an original shutter operation of corresponding one of two pixel sections among the four pixel sections sharing the charge detection section, and the original shutter operation of each of the two pixel sections is performed at an earlier time; a second OR circuit A, to which shutter control signals are input, wherein each of the shutter control signals controls an original shutter operation of corresponding one of three pixel sections among the four pixel sections sharing the charge detection section, and the original shutter operation of each of the three pixel sections is performed at an earlier time; and a third OR circuit A, to which shutter control signals are input, wherein each of the shutter control signals controls an original shutter operation of corresponding one of the four pixel sections sharing the charge detection section, when one of the four pixel sections which share the charge detection section performs an original shutter operation, in order to perform an additional shutter operation on the remaining pixel sections which share the charge detection section with the one pixel section and have not performed the original shutter operation yet, a pixel section, among the four pixel sections sharing the charge detection section, which performs an original shutter operation at the earliest time is supplied with a shutter control signal for controlling a shutter period of the pixel section, a pixel section, among the four pixel sections sharing the charge detection section, which performs an original shutter operation at the second earliest time is supplied with an output signal from the first OR circuit A, a pixel section, among the four pixel sections sharing the charge detection section, which performs an original shutter operation at the third earliest time is supplied with an output signal from the second OR circuit A, and a pixel section, among the four pixel sections sharing the charge detection section, which performs an original shutter operation at the latest time is supplied with an output signal from the third OR circuit A.

Still preferably, in an amplification-type solid-state image capturing apparatus according to the present invention, a number of the plurality of pixel sections sharing the charge detection section is 4, and the shutter control section includes: three OR circuits A: a first OR circuit A, to which shutter control signals are input, wherein each of the shutter control signals controls an original shutter operation of corresponding one of two pixel sections among the four pixel sections sharing the charge detection section, and the original shutter operation of each of the two pixel sections is performed at an earlier time; a second OR circuit A, to which shutter control signals are input, wherein each of the shutter control signals controls an original shutter operation of corresponding one of three pixel sections among the four pixel sections sharing the charge detection section, and the original shutter operation of each of the three pixel sections is performed at an earlier time; and a third OR circuit A, to which shutter control signals are input, wherein each of the shutter control signals controls an original shutter operation of corresponding one of the four pixel sections sharing the charge detection section; two OR circuits B: a first OR circuit B, to which reading control signals are input, wherein each of the reading control signals controls a reading operation of corresponding one of three pixel sections among the four pixel sections sharing the charge detection section, and the reading operation of each of the three pixel sections is performed at a later time; and a second OR circuit B, to which reading control signals are input, wherein each of the reading control signals controls a reading operation of corresponding one of two pixel sections among the four pixel sections sharing the charge detection section, and the reading operation of each of the two pixels is performed at a later time; and three OR circuits C: a first OR circuit C, to which a shutter control signal and an output signal from the first OR circuit B are input, wherein the shutter control signal controls an original shutter operation of a pixel section among the four pixel sections sharing the charge detection section, and the original shutter operation of the pixel section is performed at the earliest time; a second OR circuit C, to which an output signal from the first OR circuit A and an output signal from the second OR circuit B are input; and a third OR circuit C, to which an output signal from the second OR circuit A and a reading control signal are input, wherein the reading control signal controls a reading operation of a pixel section among the four pixel sections sharing the charge detection section, and the reading operation of the pixel section is performed at the latest time, when one of the four pixel sections which share the charge detection section performs an original shutter operation, in order to perform an additional shutter operation on the remaining pixel sections which share the charge detection section with the one pixel section and have not performed the original shutter operation yet, and when one of the four pixel sections which share the charge detection section performs a reading operation, in order to perform an additional shutter operation on the remaining pixel sections which share the charge detection section with the one pixel section and have previously performed the reading operation, a pixel section, among the four pixel sections sharing the charge detection section, which performs a reading operation at the earliest time is supplied with an output signal from the first OR circuit C, a pixel section, among the four pixel sections sharing the charge detection section, which performs a reading operation at the second earliest time is supplied with an output signal from the second OR circuit C, a pixel section, among the four pixel sections sharing the charge detection section, which performs a reading operation at the third earliest time is supplied with an output signal from the third OR circuit C, and a pixel section, among the four pixel sections sharing the charge detection section, which performs a reading operation at the latest time is supplied with an output signal from the third OR circuit A.

Still preferably, in an amplification-type solid-state image capturing apparatus according to the present invention, a number of the plurality of pixel sections sharing the charge detection section is 4, and the shutter control section includes: two OR circuits B: a first OR circuit B, to which reading control signals are input, wherein each of the reading control signals controls a reading operation of corresponding one of three pixel sections among the four pixel sections sharing the charge detection section, and the reading operation of each of the three pixels is performed at a later time; and a second OR circuit B, to which reading control signals are input, wherein each of the reading control signals controls a reading operation of corresponding one of two pixel sections among the four pixel sections sharing the charge detection section, and the reading operation of each of the two pixel sections is performed at a later time; and when one of the four pixel sections which share the charge detection section performs a reading operation, in order to perform an additional shutter operation on the remaining pixel sections which share the charge detection section with the one pixel section and have previously performed the reading operation, a pixel section, among the four pixel sections sharing the charge detection section, which performs a reading operation at the earliest time is supplied with an output signal from the first OR circuit B, a pixel section, among the four pixel sections sharing the charge detection section, which performs a reading operation at the second earliest time is supplied with an output signal from the second OR circuit B, and a pixel section, among the four pixel sections sharing the charge detection section, which performs a reading operation at the third earliest time is supplied with a reading control signal for controlling a pixel section that performs a reading operation at the latest time.

An electronic information device according to the present invention uses an amplification-type solid-state image capturing apparatus according to the present invention described above for an image capturing section thereof, thereby the objective described above being achieved.

Hereinafter, the function of the present invention having the structures described above will be described.

According to the present invention, in an amplification-type solid-state image capturing apparatus in which a single charge detection section is shared by a plurality of pixel sections, a phenomenon having a pattern of horizontal stripes at a cycle of the sharing number of pixel sections, which conventionally occurs when strong incident light is received at photoelectric conversion elements, is suppressed by adding an additional shutter operation prior to an original shutter operation and subsequent to a reading operation.

When one of the plurality of pixel sections sharing the charge detection section performs an original shutter operation, an additional shutter operation is performed on the remaining pixel sections which share the charge detection section with the one pixel section and have not performed the original shutter operation yet. As such, when a subject having high luminance is captured, signal charge accumulated up to a saturation level at photoelectric conversion elements is discharged by the shutter operation and the additional shutter operation not only from the pixel section on which the original shutter operation is performed, but also from the pixel sections which have not performed the original shutter operation yet. Thus, the overflow of signal charge from the photoelectric conversion elements to the charge detection section is suppressed. Therefore, it is possible to correctly read an original signal from the currently-read pixel section. In addition, since the additional shutter operation is performed prior to the original shutter operation, this does not affect an optical charge accumulation period set by the original shutter operation and the reading operation.

Further, in addition to the operation described above, or independent of the operation described above, when one of the plurality of pixel sections sharing the charge detection section performs a reading operation, an additional shutter operation is performed on the remaining pixel sections which share the charge detection section with the one pixel section and have previously performed a reading operation. As such, when a subject having high luminance is captured, signal charge again accumulated up to a saturation level at the photoelectric conversion elements is discharged by the additional shutter operation from the pixel sections which have previously performed the reading operation. Thus, the overflow of signal charge from the photoelectric conversion elements to the charge detection section is suppressed. Therefore, it is possible to correctly read an original signal from the currently-read pixel section. In addition, since the additional shutter operation is performed subsequent to the reading operation, this does not affect an optical charge accumulation period set by the original shutter operation and the reading operation.

Further, the number of the plurality of pixel sections sharing the charge detection section is N (N is an integer greater than or equal to 2), and in the case where an optical charge accumulation period is less than or equal to (N−1) of a multiple of a horizontal scan period, when one of the plurality of pixel sections sharing the charge detection section performs an original shutter operation, an additional shutter operation can be performed on the remaining pixel sections which share the charge detection section with the one pixel section and have not performed the original shutter operation yet. In this case, the reading operation of one of the plurality of pixel sections sharing the charge detection section is performed after the original operation is performed on the remaining pixel sections. Thus, the overflow of signal charge from the remaining pixel sections to the charge detection section is suppressed.

In addition, in the case where an optical charge accumulation period is less than or equal to (N−1) of a multiple of a horizontal scan period, when one of the plurality of pixel sections sharing the charge detection section performs a reading operation, an additional shutter operation can be performed on the remaining pixel sections which share the charge detection section with the one pixel section and have previously performed the reading operation. In this case, when the reading operation is performed on one of the plurality of pixel sections sharing the charge detection section, signal charge that has been accumulated, after the reading operation, at the photoelectric conversion elements of the remaining pixel sections that have previously performed the reading operation is discharged by the additional shutter operation. Thus, the overflow of signal charge from the remaining pixel sections to the charge detection section is suppressed.

The reset transistor described above is preferably a depression-type transistor. This is because in the case where a subject having high luminance is captured, when no reading operation nor no shutter operation is performed on any one of the plurality of pixel sections which share a single charge detection section, signal charge accumulated up to a saturation level at photoelectric conversion elements is discharged to a power supply side by an off-leak current of the depression-type reset transistor even if the signal charge accumulated up to the saturation level overflows to the charge detection section. As such, it is possible to prevent a phenomenon in which the overflowed charge flows backward to the photoelectric conversion elements, pours onto a substrate and seeps onto the surrounding of the substrate.

As described above, according to the present invention, in an amplification-type solid-state image capturing apparatus in which a single charge detection section is shared by a plurality of pixel sections, a phenomenon having a pattern of horizontal stripes at a cycle of the sharing number of pixel sections which conventionally occurs when strong incident light is received at photoelectric conversion elements is suppressed by adding an additional shutter operation at least either prior to an original shutter operation or subsequent to a reading operation. Therefore, it is possible to correctly read an original signal from the currently-read pixel section.

For example, when one of the plurality of pixel sections sharing the charge detection section performs an original shutter operation, an additional shutter operation is performed on the remaining pixel sections which share the charge detection section with the one pixel section and have not performed the original shutter operation yet. As such, when a subject having high luminance is captured, signal charge accumulated up to a saturation level at photoelectric conversion elements is discharged by the shutter operation and the additional shutter operation not only from the pixel section on which the original shutter operation is performed, but also from the pixel sections which have not performed the original shutter operation yet. Thus, the overflow of signal charge from the photoelectric conversion elements to the charge detection section can be suppressed. In this case, since the additional shutter operation is performed prior to the original shutter operation, this does not affect an optical charge accumulation period set by the original shutter operation and the reading operation.

In addition, when one of the plurality of pixel sections sharing the charge detection section performs a reading operation, an additional shutter operation is performed on the remaining pixel sections which share the charge detection section with the one pixel section and have previously performed the reading operation. As such, when a subject having high luminance is captured, signal charge again accumulated up to a saturation level at the photoelectric conversion elements is discharged by the additional shutter operation from the pixel sections which have previously performed the reading operation. Thus, the overflow of signal charge from the photoelectric conversion elements to the charge detection section can be suppressed. In this case, since the additional shutter operation is performed subsequent to the reading operation, this does not affect an optical charge accumulation period set by the original shutter operation and the reading operation.

These and other advantages of the present invention will become apparent to those skilled in the art upon reading and understanding the following detailed description with reference to the accompanying figures.

Figure 1:
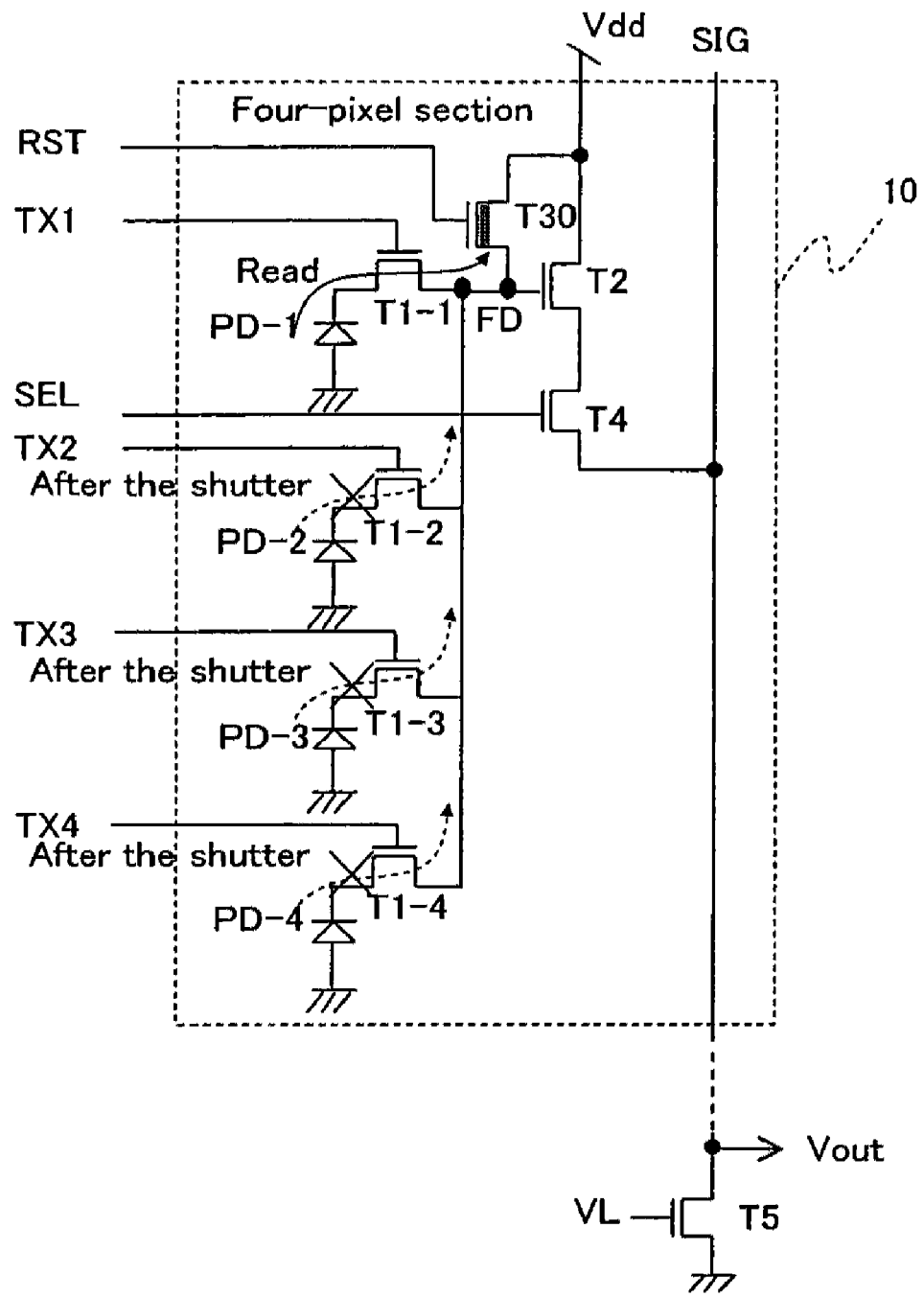
FIG. 1 is a circuit diagram showing an exemplary essential structure of a four-pixel section in a four-transistor type APS image sensor according to an embodiment of the present invention.

Portions (a) to (c) of FIG. 2 are each a timing diagram for describing an exemplary operation of the APS image sensor shown in FIG. 1.

Figure 3:
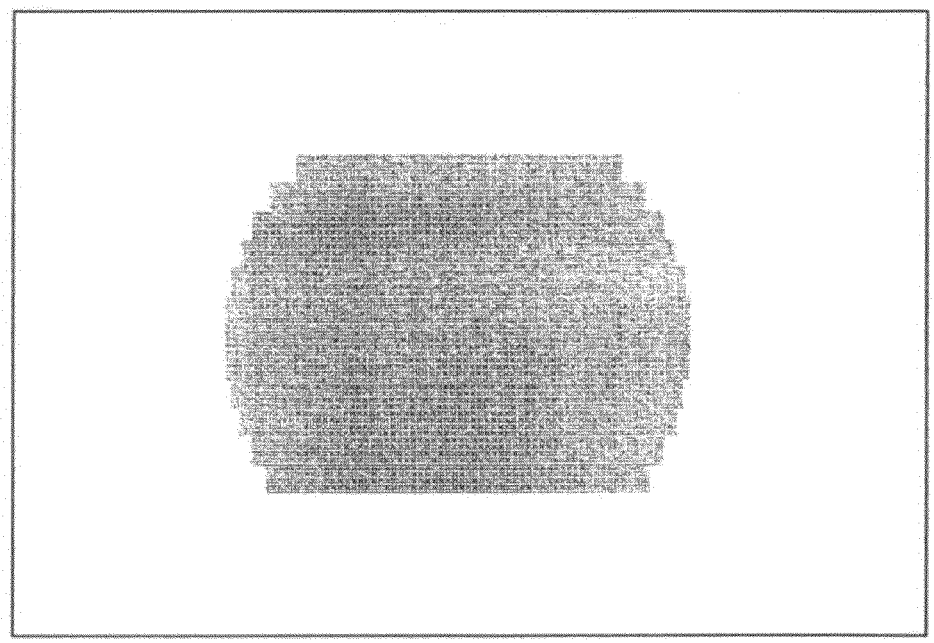

FIG. 3 is a schematic view showing a captured image obtained by the APS image sensor shown in FIG. 1.

FIG. 4 is a circuit diagram showing an exemplary essential structure of a shutter control circuit in the APS image sensor according to the present embodiment; Portion (a) of FIG. 4 is a circuit diagram when an additional shutter operation is performed on a pixel section which "has not performed an original shutter operation yet" or "has previously performed a reading operation"; Portion (b) of FIG. 4 is a circuit diagram when an additional shutter operation is performed only on a pixel section which "has not performed an original shutter operation yet"; and Portion (c) of FIG. 4 is a circuit diagram when an additional shutter operation is performed only on a pixel section which "has previously performed a reading operation".

Portions (a) and (b) of FIG. 5 are each a timing diagram for describing another exemplary operation of the APS image sensor shown in FIG. 1.

Figure 6:
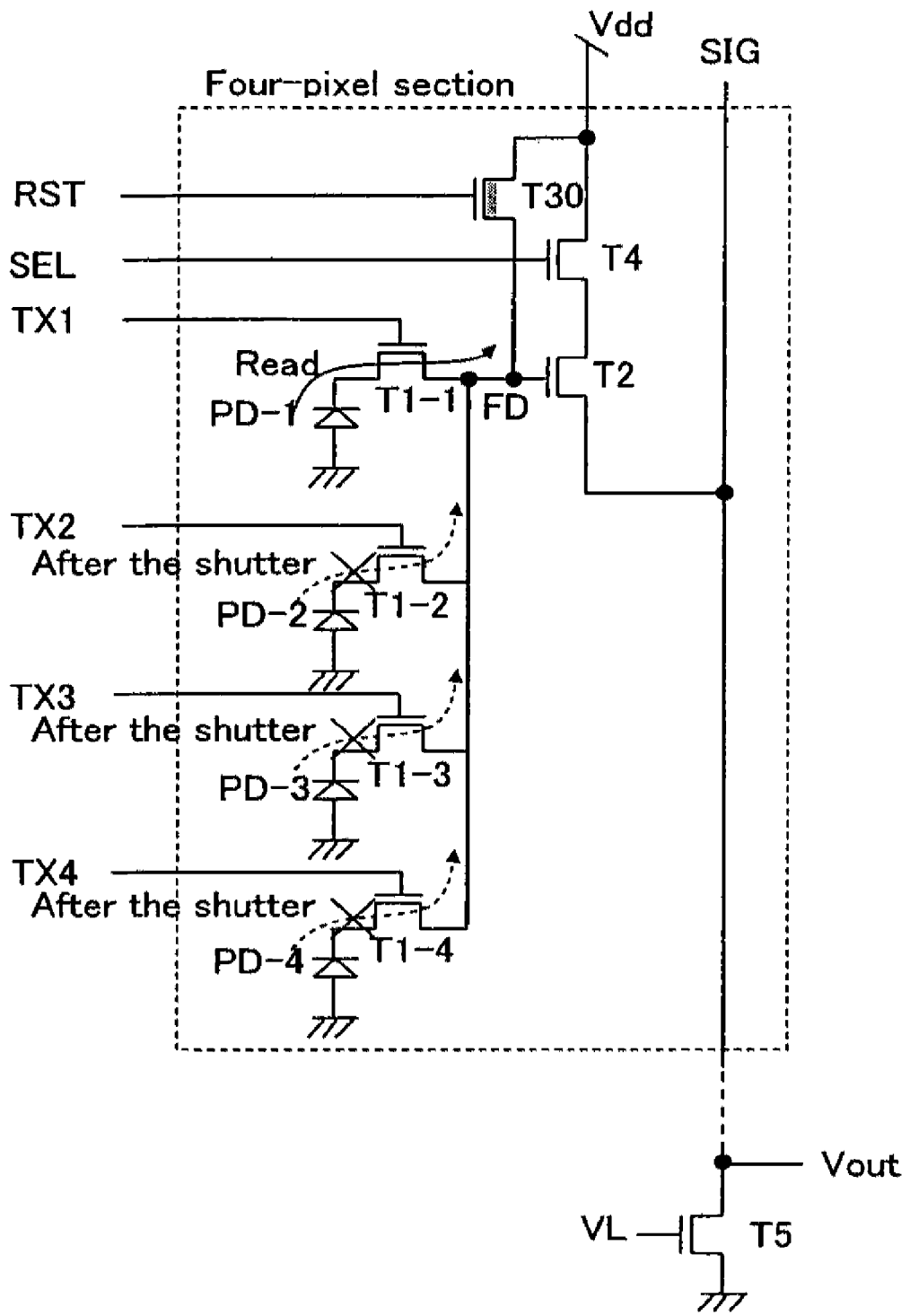

FIG. 6 is a circuit diagram showing an exemplary essential structure of a four-pixel section in a four-transistor type APS image sensor according to another embodiment of the present invention.

Figure 7:
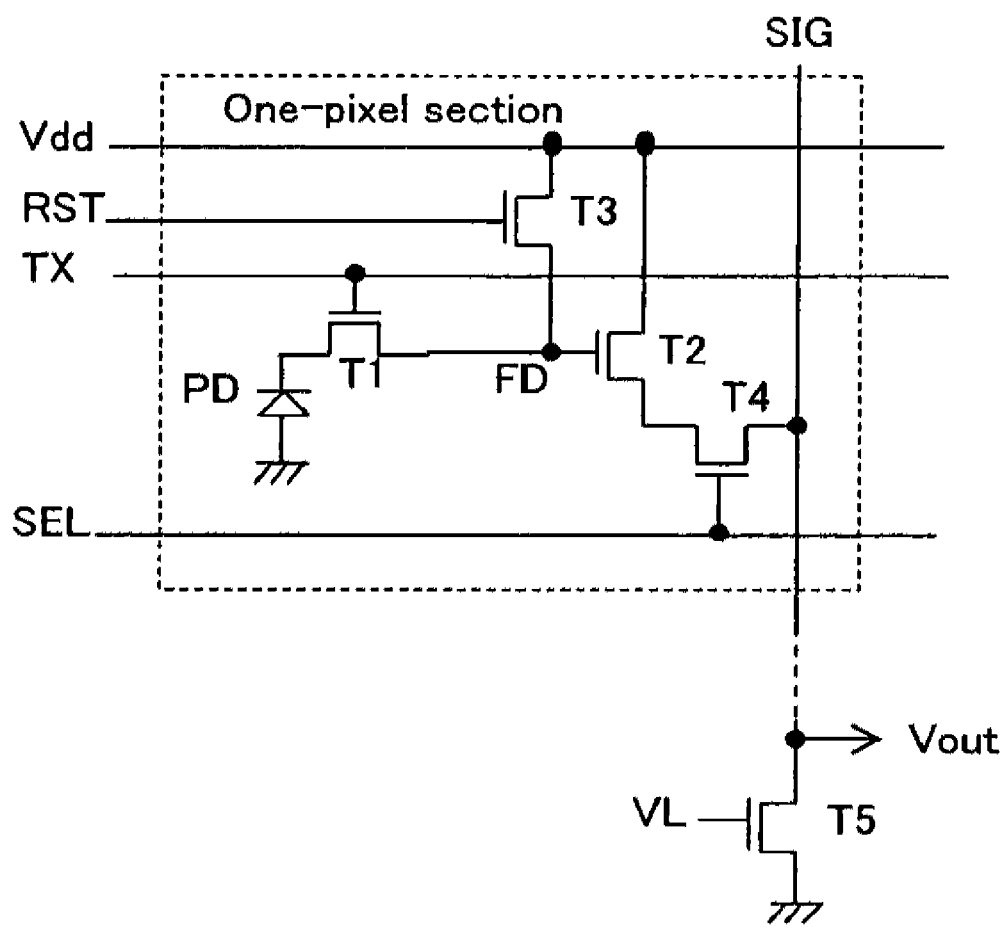

FIG. 7 is a circuit diagram showing an exemplary structure of a pixel section in a conventional amplification-type solid-state image capturing apparatus.

Figure 8:
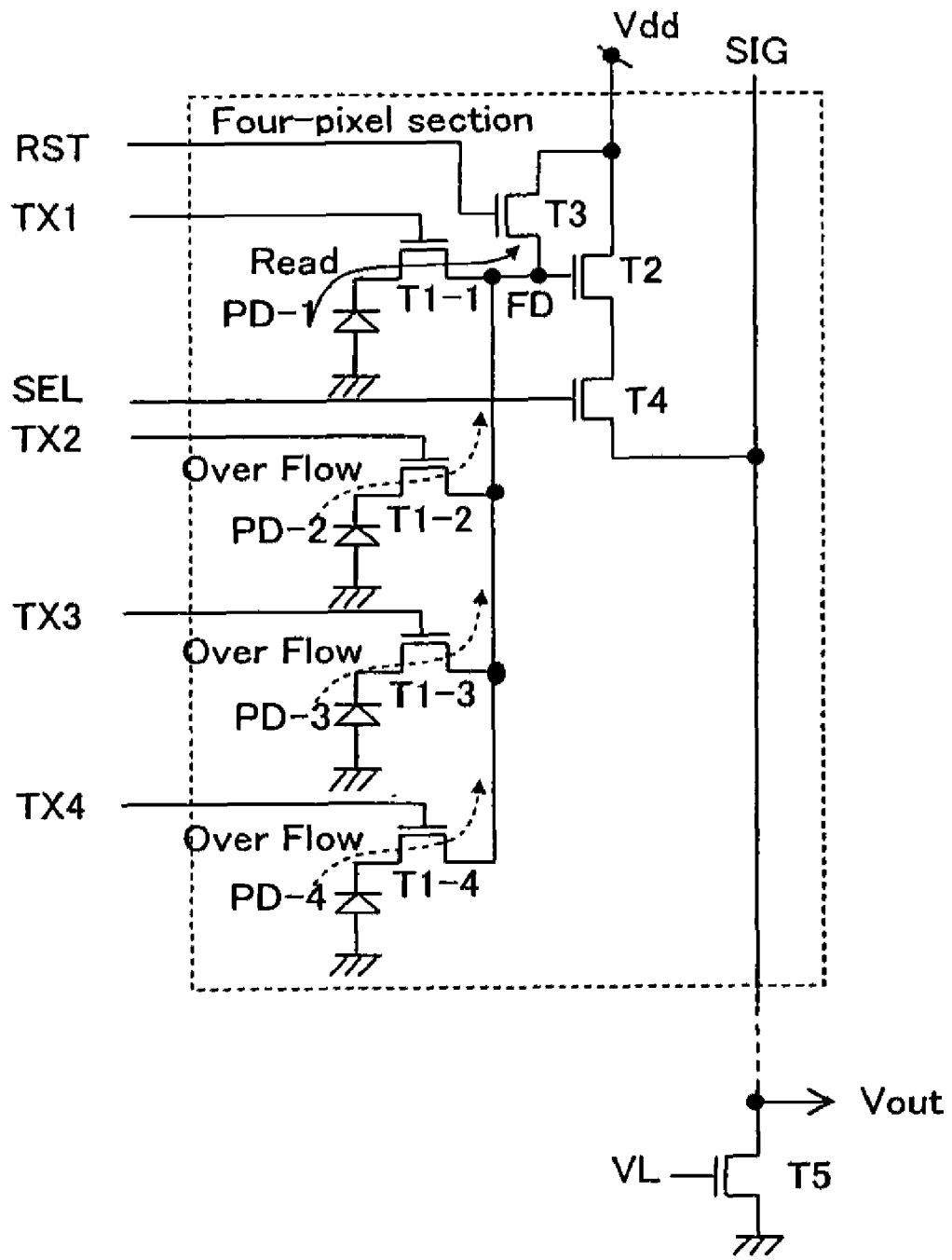

FIG. 8 is a circuit diagram showing an exemplary structure of a pixel section in a conventional amplification-type solid-state image capturing apparatus disclosed in Reference 1.

Portions (a) and (b) of FIG. 9 are each a timing diagram for describing an exemplary operation of the amplification-type solid-state image capturing apparatus shown in FIG. 8.

Figure 10:
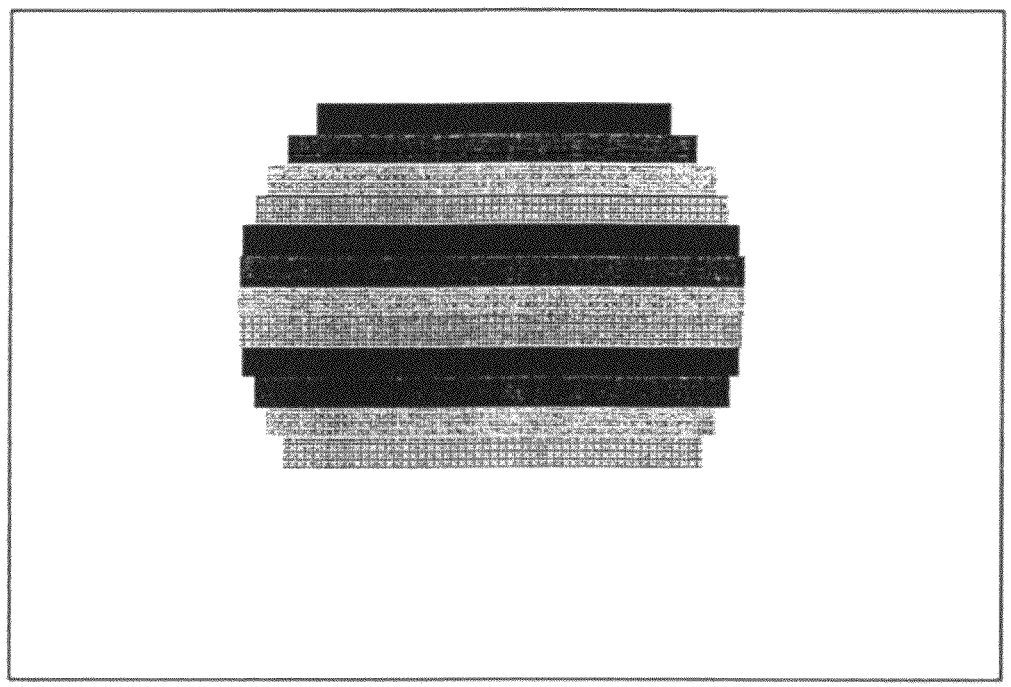

FIG. 10 is a schematic view showing a captured image obtained by the conventional amplification-type solid-state image capturing apparatus shown in FIG. 8.

10 four-pixel section
11 shutter control circuit
PD-1 to PD-4 photoelectric conversion element
T1-1 to T1-4 transfer transistor (transfer section)
FD charge detection section
T2 amplification transistor (amplification section)
T30 reset transistor (reset section)
T4 selection transistor (selection section)
T5 load transistor (load section)
TX1 to TX4 transfer transistor drive line
RST reset transistor drive line
SEL selection transistor drive line
1A to 3A, 1B, 2B, 1C to 3C OR circuit

DESCRIPTION OF THE PREFERRED EMBODIMENTS

Hereinafter, embodiments of an amplification-type solid-state image capturing apparatus according to the present invention when it is applied to a four-transistor type APS image sensor will be described in detail with reference to the accompanying drawings.

FIG. 1 is a circuit diagram showing an exemplary essential structure of a four-pixel section 10 in a four-transistor type APS image sensor according to an embodiment of the present invention.

In the four-transistor type APS image sensor according to the present embodiment in FIG. 1, four pixel sections (a plurality of pixel sections; herein four pixel sections) are used as one unit, and each four-pixel section 10 includes: four photoelectric conversion elements PD-1 to PD-4 which are adjacent to each other in a vertical direction and correspond to the respective four pixel sections; and transfer transistors T1-1 to T1-4 functioning as transfer sections capable of sequentially transferring signal charge from the photoelectric conversion elements PD-1 to PD-4 to the charge detection section FD. An end of each of the transfer transistors T1-1 to T1-4 which is not connected to each of the respective photoelectric conversion elements PD is commonly connected to the charge detection section FD. In addition, the four-pixel section 10 further includes: a reset transistor T30 functioning as a reset section for resetting potential at the charge detection section FD to a power supply voltage Vdd; an amplification transistor T2 functioning as an amplification section for amplifying the potential (signal) from the charge detection section FD; and a selection transistor T4 functioning as a selection section for selectively reading an output from the amplification transistor T2 to a reading signal line SIG. A plurality of four-pixel sections 10 is arranged in a matrix in the four-transistor type APS image sensor according to the present embodiment so as to form an image capturing region.

Gates of the transfer transistors T1-1 to T1-4 are connected to transfer transistor drive lines TX1 to TX4, respectively.

The amplification transistor T2 is connected between the power supply voltage Vdd and the selection transistor T4. A gate of the transfer transistor T2 is connected to the charge detection section FD.

The reset transistor T30 is connected between the power supply voltage Vdd and the charge detection section FD. A gate of the reset transistor T30 is connected to a reset transistor drive line RST.

The selection transistor T4 is connected between the amplification transistor T2 and the reading signal line SIG. A gate of the selection transistor T4 is connected to a selection transistor drive line SEL.

The reading signal line SIG is connected to a ground voltage end via a load transistor T5. A plurality of four-pixel sections 10 is arranged in a matrix, and a plurality of reading signal lines SIG is provided in one direction (horizontal direction).

With the structure described above, first, the reset transistor T30 is placed on an on-state, and the potential at the charge detection section FD is reset to the power supply voltage Vdd.

Then, the transfer transistor T1-1 located at the top is placed on an on-state, and signal charge is transferred from the photoelectric conversion element PD-1 to the charge detection section FD.

The potential at the charge detection section FD resulting from the difference between before and after the operation of transferring signal charge is amplified by the amplification transistor T2. Then, the amplified potential is read to the reading signal line SIG via the selection transistor T4.

Similarly, an operation of transferring signal charge to the charge detection section FD, an operation of amplifying the potential at the charge detection section FD resulting from the difference between before and after the operation of transferring signal charge and an operation of reading the amplified potential (signal) to the reading signal line SIG are subsequently performed for each of the photoelectric conversion element PD-2 located second from the top, the photoelectric conversion element PD-3 located third from the top and the photoelectric conversion element PD-4 located fourth from the top.

Next, the signal charge read to the reading signal line SIG is received by the load transistor T5 connected to the end of the reading signal line SIG so as to output a signal Vout.

In the four-transistor type APS image sensor according to the present embodiment, the start of optical charge accumulation period of a pixel is set by a shutter operation S (original shutter operation) and the end of optical charge accumulation period of the pixel is set by a reading operation R. In such an operation, when one of the plurality of pixel sections sharing the charge detection section performs a shutter operation S, the four-transistor type APS image sensor according to the present invention includes a shutter control section for performing an additional shutter operation S' on the remaining pixel sections which share the charge detection section with the one pixel section and have not performed the shutter operation S yet (pixel sections which each have not performed the original shutter operation S during the current cycle). Further, when one of the plurality of pixel sections sharing the charge detection section performs a reading operation R, the shutter control section performs an additional shutter operation S' on the remaining pixel sections which share the charge detection section with the one pixel section and which have previously performed the reading operation R (pixel sections which each have already performed the reading operation R during the current cycle). The present embodiment has a feature of an additional shutter operation S' in order to suppress the generation of a pattern of horizontal stripes due to blooming by the pixel sections other than the currently-read pixel section.

Hereinafter, the additional shutter operation S' will be described in detail.

Portion (a) of FIG. 2 is a timing diagram for describing an operation of the four-transistor type APS image sensor according to the present embodiment when a shutter period (optical charge accumulation period shortened by a shutter operation) is one horizontal scan period (1H). FIG. 2 shows a case when a reading operation is sequentially performed for each of the rows. In FIG. 2, S indicates a shutter operation, R indicates a reading operation, and S' indicates an additional shutter operation which is a feature of the present embodiment.

In Portion (a) of FIG. 2, the additional shutter operation S' is added prior to (temporarily before) the original operation S and the additional shutter operation S' is also added subsequent to (temporarily after) the reading operation R, unlike the case of the conventional technique shown in Portion (a) of FIG. 9.

As such, when a reading operation R is performed on a photoelectric conversion element PD at each of the first row to the fourth row sharing the charge detection section FD, signal charge which has been accumulated prior to the shutter operation S and signal charge which has been accumulated subsequent to the reading operation R at the photoelectric conversion elements PD at the remaining rows are discharged by the shutter operation S or S'. Thus, the overflow of signal charge to the charge detection section FD is prevented. Therefore, when the reading of signal charge is performed at any one of the first row to the fourth row, it is possible to correctly read the signal charge accumulated at the photoelectric conversion element, and a pattern of horizontal stripes at a four-row cycle, which conventionally happens, does not occur. A display of captured image having no pattern of horizontal stripes at a four-row cycle is shown in FIG. 3.

Portion (b) of FIG. 2 is a timing diagram for describing an operation of the four-transistor type APS image sensor according to the present embodiment when a shutter period (optical charge accumulation period shortened by a shutter operation) is two horizontal scan periods (2H). Portion (c) of FIG. 2 is a timing diagram for describing an operation of the four-transistor type APS image sensor according to the present embodiment when a shutter period (optical charge accumulation period shortened by a shutter operation) is three horizontal scan periods (3H).

Also in the cases shown in Portion (b) of FIG. 2 and Portion (c) of FIG. 2, with the same operations as in the case of Portion (a) of FIG. 2, when a reading operation R is performed on a photoelectric conversion element PD at each of the first row to the fourth row sharing the charge detection section FD, signal charge which has been accumulated prior to the shutter operation S and signal charge which has been accumulated subsequent to the reading operation R at the photoelectric conversion elements PD at the remaining rows are discharged by the shutter operation S or S'. Thus, the overflow of signal charge to the charge detection section FD is prevented. Therefore, when the reading of signal charge is performed at any one of the first row to the fourth row, it is possible to correctly read the signal charge accumulated at the photoelectric conversion element, and a pattern of horizontal stripes at a four-row cycle, which conventionally happens, does not occur.

As described above, in the four-transistor type APS image sensor according to the present embodiment, the start of optical charge accumulation period of a pixel is set by a shutter operation S and the end of optical charge accumulation period of the pixel is set by a reading operation R. In such an operation, when one of the plurality of pixel sections sharing the charge detection section FD performs a shutter operation S, an additional shutter operation S' is performed on the remaining pixel sections which share the charge detection section FD with the one pixel section and have not performed the shutter operation S yet. Also, when one of the plurality of pixel sections sharing the charge detection section FD performs a reading operation R, an additional shutter operation S' is performed on the remaining pixel sections which share the charge detection section FD with the one pixel section and have previously performed the reading operation R.

Hereinafter, a shutter control circuit 11 functioning as the shutter control section for controlling the shutter operations S and S' will be described in detail.

FIG. 4 is a circuit diagram showing an exemplary essential structure (one example) of the shutter control circuit 11 in the APS image sensor according to the present embodiment. Portion (a) of FIG. 4 is a circuit diagram when an additional shutter operation is performed on a pixel section which "has not performed an original shutter operation yet" or "has previously performed a reading operation". Portion (b) of FIG. 4 is a circuit diagram when an additional shutter operation is performed only on a pixel section which "has not performed an original shutter operation yet". Portion (c) of FIG. 4 is a circuit diagram when an additional shutter operation is performed only on a pixel section which "has previously performed a reading operation". Portions (a) to (c) of FIG. 4 each show a case in which a reading operation is sequentially performed for each of the rows.

The shutter control circuit 11 shown in Portion (a) of FIG. 4 is merely an example. In this case, the number of the plurality of pixel sections sharing a single charge detection section FD is M (M is an integer number greater than or equal to 2; in this case, M=4, for example), and the shutter control circuit 11 includes: three OR circuits 1A to 3A: an OR circuit 1A (first OR circuit A), to which shutter control signals sh_i1 and sh_i2 are input, wherein each of the shutter control signals sh_i1 and sh_i2 controls an original shutter operation of corresponding one of two pixel sections (at the first row and the second row) among the four pixel sections sharing the charge detection section FD, and the original shutter operation of the two pixel sections is performed at an earlier time; an OR circuit 2A (second OR circuit A), to which shutter control signals sh_i1 to sh_i3 are input, wherein each of the shutter control signals sh_i1 to sh_i3 controls an original shutter operation of corresponding one of three pixel sections (at the first row to the third row) among the four pixel sections sharing the charge detection section FD, and the original shutter operation of the three pixel sections is performed at an earlier time; and an OR circuit 3A (third OR circuit A), to which shutter control signals sh_i1 to sh_i4 are input, wherein each of the shutter control signals sh_i1 to sh_i4 controls an original shutter operation of corresponding one of the four pixel sections (at the first row to the fourth row) sharing the charge detection section FD; two OR circuits 1B and 2B: an OR circuit 1B (first OR circuit B), to which reading control signals rd_i2 to rd_i4 are input, wherein each of the reading control signals rd_i2 to rd_i4 controls a reading operation of corresponding one of three pixel sections (at the second row to the fourth row) among the four pixel sections sharing the charge detection section FD, and the reading operation of the three pixel sections is performed at a later time; and an OR circuit 2B (second OR circuit B), to which reading control signals rd_i3 and rd_i4 are input, wherein each of the reading control signals rd_i3 and rd_i4 controls a reading operation of corresponding one of two pixel sections (at the third row to the fourth row) among the four pixel sections sharing the charge detection section FD, and the reading operation of the two pixel sections is performed at a later time; and three OR circuits 1C to 3C: an OR circuit 1C (first OR circuit C), to which the shutter control signal sh_i1 and an output signal from the OR circuit 1B are input, wherein the shutter control signal sh_i1 controls an original shutter operation of a pixel section (at the first row) among the four pixel sections sharing the charge detection section FD, and the original shutter operation of the pixel section is performed at the earliest time; an OR circuit 2C (second OR circuit C), to which an output signal from the OR circuit 1A and an output signal from the OR circuit 2B are input; and an OR circuit 3C (third OR circuit C), to which an output signal from the OR circuit 2A and the reading control signal rd_i4 are input, wherein the reading control signal rd_i4 controls a reading operation of a pixel section (at the fourth row) among the four pixel sections sharing the charge detection section FD, and the reading operation of the pixel section is performed at the latest time.

In the shutter control circuit 11, a pixel section (at the first row), among the four pixel sections sharing the charge detection section FD, which performs the reading operation at the earliest time is supplied with an output signal sh_i1C from the OR circuit 1C, a pixel section (at the second row), among the four pixel sections which share the charge detection section FD, which performs the reading operation at the second earliest time is supplied with an output signal sh_i2C from the OR circuit 2C, a pixel section (at the third row), among the four pixel sections which share the charge detection section FD, which performs the reading operation at the third earliest time is supplied with an output signal sh_i3C from the OR circuit 3C, and a pixel section (at the fourth row), among the four pixel sections share the charge detection section FD, which performs the reading operation at the latest time is supplied with an output signal sh_i4C from the OR circuit 3A.

In this manner, when one of the four pixel sections which share the charge detection section FD performs an original shutter operation, an additional shutter operation is performed on the remaining pixel sections which share the charge detection section FD with the one pixel section and have not performed the original shutter operation yet. Also, when one of the four pixel sections which share the charge detection section FD performs a reading operation, an additional shutter operation is performed on the remaining pixel sections which share the charge detection section FD with the one pixel section and have previously performed the reading operation.

As described above, according to the amplification-type solid-state image capturing apparatus of the present embodiment, pixel sections (the first row to the fourth row) include: photoelectric conversion elements PD1 to PD4; transfer transistors T1-1 to T1-4 for transferring signal charge from the photoelectric conversion elements PD1 to PD4 to a single charge detection section FD, respectively, wherein the pixel sections (the first row to the fourth row) are commonly connected to the charge detection section FD; a reset transistor T3 for resetting potential at the charge detection section FD to a power supply voltage Vdd; and an amplification transistor T2 for amplifying and reading the potential at the charge detection section FD. The start of optical charge accumulation period of a pixel is set by a shutter operation and the end of optical charge accumulation period of the pixel is set by a reading operation. In such an operation, when one of the plurality of pixel sections sharing the charge detection section FD performs an original shutter operation, an additional shutter operation is performed on the remaining pixel sections which share the charge detection section FD with the one pixel section and have not performed the original shutter operation yet. Therefore, when a charge detection section FD in an amplification-type solid-state image capturing apparatus is shared by a plurality of photoelectric conversion elements, it is possible to prevent the phenomenon of having a pattern of horizontal stripes at a cycle of the sharing number of photoelectric conversion elements generated due to strong incident light.

In the embodiment described above, the number of pixel sections (PD+T1) which share a single charge detection section (FD) is N=4. However, as long as the number (N) of pixel sections which share a single charge detection section is an integer greater than or equal to 2, the amplification-type solid-state image capturing apparatus according to the present invention can be applied thereto. The above embodiment has described the case in which the amplification-type solid-state image capturing apparatus according to the present invention is applied to a four-transistor type APS image sensor. Alternatively, the amplification-type solid-state image capturing apparatus according to the present invention can be applied to a two-transistor type or three-transistor type APS image sensor or a five-transistor type APS image sensor.

In addition, the number of pixel sections which share a single charge detection section FD is N (N is an integer greater than or equal to 2), and when an optical charge accumulation period (period set by the shutter operation S and the reading operation R) is less than or equal to (N−1) of a multiple of a horizontal scan period, it is preferable to perform the additional shutter operation described above. In the case where the optical charge accumulation period is greater than or equal to N horizontal scan period (N×H), when a reading operation R is performed on a pixel section, a pattern of horizontal stripes at an N-row cycle does not occur since an overflow does not affect the reading operation R, and thus each of the remaining pixel sections has the same state to each other.

The above embodiment has described the case in which when one of the plurality of pixel sections sharing the charge detection section FD performs an original shutter operation, the shutter control circuit 11 performs an additional shutter operation on the remaining pixel sections which share the charge detection section FD with the one pixel section and have not performed the original shutter operation S yet, and when one of the plurality of pixel sections sharing the charge detection section FD performs a reading operation, the shutter control circuit 11 performs an additional shutter operation on the remaining pixel sections which share the charge detection section FD with the one pixel section and have previously performed the reading operation. However, the present invention is not limited to this. When one of the plurality of pixel sections sharing the charge detection section FD performs an original shutter operation, the shutter control circuit 11 can perform an additional shutter operation on the remaining pixel sections which share the charge detection section FD with the one pixel section and have not performed the original shutter operation yet. Alternatively, when one of the plurality of pixel sections sharing the charge detection section FD performs a reading operation, the shutter control circuit 11 can perform an additional shutter operation on the remaining pixel sections which share the charge detection section FD with the one pixel section and have previously performed the reading operation.

In the embodiment described above, when an original shutter operation is performed on one of the plurality of pixel sections which share a single charge detection section FD, OR circuits 1A to 3A can be provided, as shown in Portion (b) of FIG. 4, in order to perform an additional shutter operation on the remaining pixel sections which share the charge detection section FD with the one pixel section and have not performed the original shutter operation yet. In addition, in the embodiment described above, when a reading operation is performed on one of the plurality of pixel sections which share a single charge detection section FD, OR circuits 1B and 2B can be provided, as shown in Portion (c) of FIG. 4, in order to perform an additional shutter operation on the remaining pixel sections which share the charge detection section FD with the one pixel section and have previously performed the reading operation.

More specifically, as shown in Portion (a) of FIG. 4, when an additional shutter operation is performed on a pixel section which "has not performed an original shutter operation yet" or "has previously performed a reading operation", the number of the plurality of pixel sections sharing the charge detection section FD is 4, and the shutter control section includes: three OR circuits A: an OR circuit 1A, to which shutter control signals are input, wherein each of the shutter control signals controls an original shutter operation of corresponding one of two pixel sections among the four pixel sections sharing the charge detection section FD, and the original shutter operation of each of the two pixel sections is performed at an earlier time; an OR circuit 2A, to which shutter control signals are input, wherein each of the shutter control signals controls an original shutter operation of corresponding one of three pixel sections among the four pixel sections sharing the charge detection section FD, and the original shutter operation of each of the three pixel sections is performed at an earlier time; and an OR circuit 3A, to which shutter control signals are input, wherein each of the shutter control signals controls an original shutter operation of corresponding one of the four pixel sections sharing the charge detection section FD; two OR circuits B: an OR circuit 1B, to which reading control signals are input, wherein each of the reading control signals controls a reading operation of corresponding one of three pixel sections among the four pixel sections sharing the charge detection section FD, and the reading operation of each of the three pixel sections is performed at a later time; and an OR circuit 2B, to which reading control signals are input, wherein each of the reading control signals controls a reading operation of corresponding one of two pixel sections among the four pixel sections sharing the charge detection section FD, and the reading operation of each of the two pixels is performed at a later time; and three OR circuits C: an OR circuit 1C, to which a shutter control signal and an output signal from the OR circuit 1B are input, wherein the shutter control signal controls an original shutter operation of a pixel section among the four pixel sections sharing the charge detection section FD, and the original shutter operation of the pixel section is performed at the earliest time; an OR circuit 2C, to which an output signal from the OR circuit 1A and an output signal from the OR circuit 2B are input; and an OR circuit 3C, to which an output signal from the OR circuit 2A and a reading control signal are input, wherein the reading control signal controls a reading operation of a pixel section among the four pixel sections sharing the charge detection section FD, and the reading operation of the pixel section is performed at the latest time, when one of the four pixel sections which share the charge detection section FD performs an original shutter operation, in order to perform an additional shutter operation on the remaining pixel sections which share the charge detection section FD with the one pixel section and have not performed the original shutter operation yet, and when one of the four pixel sections which share the charge detection section FD performs a reading operation, in order to perform an additional shutter operation on the remaining pixel sections which share the charge detection section FD with the one pixel section and have previously performed the reading operation, a pixel section, among the four pixel sections sharing the charge detection section FD, which performs a reading operation at the earliest time is supplied with an output signal from the OR circuit 1C, a pixel section, among the four pixel sections sharing the charge detection section FD, which performs a reading operation at the second earliest time is supplied with an output signal from the OR circuit 2C, a pixel section, among the four pixel sections sharing the charge detection section FD, which performs a reading operation at the third earliest time is supplied with an output signal from the OR circuit 3C, and a pixel section, among the four pixel sections sharing the charge detection section FD, which performs a reading operation at the latest time is supplied with an output signal from the OR circuit 3A.

In addition, as shown in Portion (b) of FIG. 4, when an additional shutter operation is performed only on a pixel section which "has not performed an original shutter operation yet", the number of the plurality of pixel sections sharing the charge detection section FD is 4, and the shutter control section includes: three OR circuits A: an OR circuit 1A, to which shutter control signals are input, wherein each of the shutter control signals controls an original shutter operation of corresponding one of two pixel sections among the four pixel sections sharing the charge detection section FD, and the original shutter operation of each of the two pixel sections is performed at an earlier time; an OR circuit 2A, to which shutter control signals are input, wherein each of the shutter control signals controls an original shutter operation of corresponding one of three pixel sections among the four pixel sections sharing the charge detection section FD, and the original shutter operation of each of the three pixel sections is performed at an earlier time; and an OR circuit 3A, to which shutter control signals are input, wherein each of the shutter control signals controls an original shutter operation of corresponding one of the four pixel sections sharing the charge detection section FD, when one of the four pixel sections which share the charge detection section FD performs an original shutter operation, in order to perform an additional shutter operation on the remaining pixel sections which share the charge detection section FD with the one pixel section and have not performed the original shutter operation yet, a pixel section, among the four pixel sections sharing the charge detection section FD, which performs an original shutter operation at the earliest time is supplied with a shutter control signal for controlling a shutter period of the pixel section, a pixel section, among the four pixel sections sharing the charge detection section FD, which performs an original shutter operation at the second earliest time is supplied with an output signal from the OR circuit 1A, a pixel section, among the four pixel sections sharing the charge detection section FD, which performs an original shutter operation at the third earliest time is supplied with an output signal from the OR circuit 2A, and a pixel section, among the four pixel sections sharing the charge detection section FD, which performs an original shutter operation at the latest time is supplied with an output signal from the OR circuit 3A.

In addition, as shown in Portion (c) of FIG. 4, when an additional shutter operation is performed only on a pixel section which "has previously performed a reading operation", the number of the plurality of pixel sections sharing the charge detection section FD is 4, and the shutter control section includes: two OR circuits B: an OR circuit 1B, to which reading control signals are input, wherein each of the reading control signals controls a reading operation of corresponding one of three pixel sections among the four pixel sections sharing the charge detection section FD, and the reading operation of each of the three pixels is performed at a later time; and an OR circuit 2B, to which reading control signals are input, wherein each of the reading control signals controls a reading operation of corresponding one of two pixel sections among the four pixel sections sharing the charge detection section FD, and the reading operation of each of the two pixel sections is performed at a later time; and when one of the four pixel sections which share the charge detection section FD performs a reading operation, in order to perform an additional shutter operation on the remaining pixel sections which share the charge detection section FD with the one pixel section and have previously performed the reading operation, a pixel section, among the four pixel sections sharing the charge detection section FD, which performs a reading operation at the earliest time is supplied with an output signal from the OR circuit 1B, a pixel section, among the four pixel sections sharing the charge detection section FD, which performs a reading operation at the second earliest time is supplied with an output signal from the OR circuit 2B, and a pixel section, among the four pixel sections sharing the charge detection section FD, which performs a reading operation at the third earliest time is supplied with a reading control signal for controlling a pixel section that performs a reading operation at the latest time.

Herein, a description will be made regarding the number of the plurality of pixel sections sharing the charge detection section FD which is M (M is an integer greater than or equal to 2). In this case, the shutter control section includes: (M−1) number of OR circuits A: an OR circuit 1A, to which shutter control signals are input, wherein each of the shutter control signals controls an original shutter operation of corresponding one of two pixel sections among the plurality of pixel sections sharing the charge detection section FD, and the original shutter operation of each of the two pixel sections is performed at an earlier time; an OR circuit 2A, to which shutter control signals are input, wherein each of the shutter control signals controls the original shutter operation of corresponding one of three pixel sections among the plurality of pixel sections sharing the charge detection section FD, and the original shutter operation of each of the three pixel sections is performed at an earlier time; . . . an OR circuit (M−2)A, to which shutter control signals are input, wherein the shutter control signals controls the original shutter operation of corresponding one of (M−1) pixel sections among the plurality of pixel sections sharing the charge detection section FD, and the original shutter operation of each of the (M−1) pixel sections is performed at an earlier time; and an OR circuit (M−1)A, to which shutter control signals are input, wherein each of the shutter control signals controls the original shutter operation of corresponding one of the plurality of pixel sections sharing the charge detection section FD; (M−2) number of OR circuits B: an OR circuit 1B, to which reading control signals are input, wherein each of the reading control signals controls a reading operation of corresponding one of (M−1) pixel sections among the plurality of pixel sections sharing the charge detection section FD, and the reading operation of each of the (M−1) pixel sections is performed at a later time; an OR circuit 2B, to which reading control signals are input, wherein each of the reading control signals controls a reading operation of corresponding one of (M−2) pixel sections among the plurality of pixel sections sharing the charge detection section FD, and the reading operation of each of the (M−2) pixel sections is performed at a later time; . . . an OR circuit (M−3)B, to which reading control signals are input, wherein each of the reading control signals controls a reading operation of corresponding one of three pixel sections among the plurality of pixel sections sharing the charge detection section FD, and the reading operation of each of the three pixel sections is performed at a later time; and an OR circuit (M−2)B, to which reading control signals are input, wherein each of the reading control signals controls a reading operation of corresponding one of two pixel sections among the plurality of pixel sections sharing the charge detection section FD, and the reading operation of each of the two pixel sections is performed at a later time; and (M−1) number of OR circuits C: an OR circuit 1C, to which a shutter control signal and an output signal from the OR circuit 1B are input, wherein the shutter control signal controls an original shutter operation of a pixel section among the plurality of pixel sections sharing the charge detection section FD, and the original shutter operation of the pixel section is performed at the earliest time; an OR circuit 2C, to which an output signal from the OR circuit 1A and an output signal from the OR circuit 2B are input; . . . an OR circuit (M−2)C, to which an output signal from the OR circuit (M−3)A and an output signal from the OR circuit (M−2)B are input; and an OR circuit (M−1)C, to which an output signal from the OR circuit (M−2)A and a reading control signal are input, wherein the reading control signal controls a reading operation of a pixel section among the plurality of pixel sections sharing the charge detection section FD, and the reading operation of the pixel section is performed at the latest time, when one of the plurality of pixel sections which share the charge detection section FD performs an original shutter operation, in order to perform an additional shutter operation on the remaining pixel sections which share the charge detection section FD with the one pixel section and have not performed the original shutter operation yet, and when one of the plurality of pixel sections which share the charge detection section FD performs a reading operation, in order to perform an additional shutter operation on the remaining pixel sections which share the charge detection section FD with the one pixel section and have previously performed a reading operation, a pixel section, among the plurality of pixel sections sharing the charge detection section FD, which performs a reading operation at the earliest time is supplied with an output signal from the OR circuit 1C, a pixel section, among the plurality of pixel sections sharing the charge detection section FD, which performs a reading operation at the second earliest time is supplied with an output signal from the OR circuit 2C, . . . a pixel section, among the plurality of pixel sections sharing the charge detection section FD, which performs a reading operation at the (M−2)th earliest time is supplied with an output signal from the OR circuit (M−2)C, a pixel section, among the plurality of pixel sections sharing the charge detection section FD, which performs a reading operation at the (M−1)th earliest time is supplied with an output signal from the OR circuit (M−1)C, a pixel section, among the plurality of pixel sections sharing the charge detection section FD, which performs a reading operation at the latest time is supplied with an output signal from the OR circuit (M−1)A.

Alternatively, the number of the plurality of pixel sections sharing the charge detection section FD is M (M is an integer greater than or equal to 2), and the shutter control section includes (M−1) number of OR circuits: an OR circuit 1A, to which shutter control signals are input, wherein each of the shutter control signals controls an original shutter operation of corresponding one of two pixel sections among the plurality of pixel sections sharing the charge detection section FD, and the original shutter operation of each of the two pixel sections is performed at an earlier time; an OR circuit 2A, to which shutter control signals are input, wherein each of the shutter control signals controls an original shutter operation of corresponding one of three pixel sections among the plurality of pixel sections sharing the charge detection section FD, and the original shutter operation of the three pixel sections is performed at an earlier time; . . . an OR circuit (M−2)A, to which shutter control signals are input, wherein each of the shutter control signals controls an original shutter operation of corresponding one of (M−1) pixel sections among the plurality of pixel sections sharing the charge detection section FD, and the original shutter operation of each of the (M−1) pixel sections is performed at an earlier time; and an OR circuit (M−1)A, to which shutter control signals are input, wherein each of the shutter control signals controls an original shutter operation of corresponding one of the plurality of pixel sections sharing the charge detection section FD, when one of the plurality of pixel sections which share the charge detection section FD performs an original shutter operation, in order to perform an additional shutter operation on the remaining pixel sections which share the charge detection section FD with the one pixel section and have not performed an original shutter operation yet, a pixel section, among the plurality of pixel sections sharing the charge detection section FD, which performs an original shutter operation at the earliest time is supplied with a shutter control signal for controlling a shutter period of the pixel section, a pixel section, among the plurality of pixel sections sharing the charge detection section FD, which performs an original shutter operation at the second earliest time is supplied with an output signal from the OR circuit 1A, a pixel section, among the plurality of pixel sections sharing the charge detection section FD, which performs an original shutter operation at the third earliest time is supplied with an output signal from the OR circuit 2A, . . . a pixel section, among the plurality of pixel sections sharing the charge detection section FD, which performs an original shutter operation at the (M−1)th earliest time is supplied with an output signal from the OR circuit (M−2)A, and a pixel section, among the plurality of pixel sections sharing the charge detection section FD, which performs an original shutter operation at the latest time is supplied with an output signal from the OR circuit (M−1)A.

Alternatively, the number of the plurality of pixel sections sharing the charge detection section FD is M (M is an integer greater than or equal to 2), and the shutter control section includes: (M−2) number of OR circuits B: an OR circuit 1B, to which reading control signals are input, wherein each of the reading control signals controls a reading operation of corresponding one of (M−1) pixel sections among the plurality of pixel sections sharing the charge detection section FD, and the reading operation of each of the (M−1) pixel sections is performed at a later time; an OR circuit 2B, to which reading control signals are input, wherein each of the reading control signals controls a reading operation of corresponding one of (M−2) pixel sections among the plurality of pixel sections sharing the charge detection section FD, and the reading operation of each of the (M−2) pixel sections is performed at a later time; . . . an OR circuit (M−3)B, to which reading control signals are input, wherein each of the reading control signals controls a reading operation of corresponding one of three pixel sections among the plurality of pixel sections sharing the charge detection section FD, and the reading operation of each of the three pixel sections is performed at a later time; and an OR circuit (M−2)B, to which reading control signals are input, wherein each of the reading control signals controls a reading operation of corresponding one of two pixel sections among the plurality of pixel sections sharing the charge detection section FD, and the reading operation of each of the two pixel sections is performed at a later time, when one of the plurality of pixel sections which share the charge detection section FD performs a reading operation, in order to perform an additional shutter operation on the remaining pixel sections which share the charge detection section FD with the one pixel section and have previously performed the reading operation, a pixel section, among the plurality of pixel sections sharing the charge detection section FD, which performs a reading operation at the earliest time is supplied with an output signal from the OR circuit 1B, a pixel section, among the plurality of pixel sections sharing the charge detection section FD, which performs a reading operation at the second earliest time is supplied with an output signal from the OR circuit 2B, . . . a pixel section, among the plurality of pixel sections sharing the charge detection section FD, which performs a reading operation at the (M−3)th earliest time is supplied with an output signal from the OR circuit (M−3)B, a pixel section, among the plurality of pixel sections sharing the charge detection section FD, which performs a reading operation at the (M−2)th earliest time is supplied with an output signal from the OR circuit (M−2)B, a pixel section, among the plurality of pixel sections sharing the charge detection section FD, which performs a reading operation at the (M−1)th earliest time is supplied with a reading control signal for controlling a pixel section that performs a reading operation at the latest time.

It should be noted that the reset transistor T30 in FIG. 1 is preferably a depression-type transistor. This is because in the case where a subject having high luminance is captured, when no reading operation nor no shutter operation is performed on any one of the pixel sections which share a single charge detection section FD, signal charge accumulated up to a saturation level at photoelectric conversion elements PD is discharged to a power supply side by an off-leak current of the depression-type reset transistor T30 even if the signal charge accumulated up to the saturation level overflows to the charge detection section FD. As such, it is possible to prevent a phenomenon in which the overflowed charge flows backward to the photoelectric conversion elements, pours onto a substrate and seeps onto the surrounding of the substrate. An enhancement-type transistor can be used for each of the transfer transistor T1, the amplification transistor T2 and the selection transistor T4. In addition, an embedded photodiode can be used for a photoelectric conversion element PD.

FIG. 2 shows the case in which signal charge from each of the pixel sections which share a single charge detection section FD is sequentially read in one direction. However, the present invention is not limited to this. Alternatively, the present invention can be applied to a case in which signal charge from each of the pixel sections which share a single charge detection section FD is read in a non-sequential manner.

For example, in the case where a reading operation is performed in a non-sequential manner, Portion (a) of FIG. 5 shows a timing diagram of when a reading operation is performed in the order of the first row→the third row→the second row→the fourth row with the application of the present invention, and Portion (b) of FIG. 5 shows a timing diagram when a reading operation is performed in the order of the first row→the third row→(the Xth row)→the second row→the fourth row with the application of the present invention. The Xth row referred to herein indicates a row which does not share a single charge detection section FD with the photoelectric conversion elements PD at the first row to the fourth row. In both cases in FIG. 5, when a reading operation R is performed on the photoelectric conversion element PD at each of the first row to the fourth row which share the charge detection section FD, signal charge which has been accumulated prior to the shutter operation S and signal charge which has been accumulated subsequent to the reading operation R are discharged by the shutter operation (S and S'). Thus, the overflow of signal charge from the charge detection section FD can be prevented, as in the case of FIG. 2.

The configuration of the logic circuits in the shutter control circuit 11 when signal charge is read in an non-sequential manner is complex. Thus, the description thereof will be omitted herein.

The above embodiment has described the case in which the selection transistor T4 for selectively reading an output as signal data from the amplification transistor T2 to the reading signal line SIG is provided between the amplification transistor T2 and the reading signal line SIG, as shown in FIG. 1. However, the present invention is not limited to this. Alternatively, the selection transistor T4 for selectively reading an output as signal data from the amplification transistor T2 to the reading signal line SIG can be provided between the amplification transistor T2 and a voltage output end of the power supply Vdd, as shown in FIG. 6. The position of the selection transistor T4 in each of the cases of FIG. 1 and FIG. 6 is different from each other in that the selection transistor T4 is provided between the amplification transistor T2 and the reading signal line SIG in FIG. 1, and the selection transistor T4 is provided between the amplification transistor T2 and a voltage output end of the power supply Vdd. However, in both cases, the selection transistor T4 can perform a selection in the same manner, and it can selectively read an output from the amplification transistor T2 to the reading signal line SIG.

As described above, the present invention is exemplified by the use of its preferred embodiment(s). However, the present invention should not be interpreted solely based on the embodiment(s) described above. It is understood that the scope of the present invention should be interpreted solely based on the claims. It is also understood that those skilled in the art can implement equivalent scope of technology, based on the description of the present invention and common knowledge from the description of the detailed preferred embodiments of the present invention. Furthermore, it is understood that any patent, any patent application and any references cited in the present specification should be incorporated by reference in the present specification in the same manner as the contents are specifically described therein.

INDUSTRIAL APPLICABILITY

According to the present invention, in a field of: an amplification-type solid-state image capturing apparatus having an amplification function for amplifying and reading signal charge, into which light of a subject is photoelectrically converted by a photoelectric conversion element; and an electronic information device using the amplification-type solid-state image capturing apparatus for an image capturing section thereof, and in particular, the present invention relates to: an amplification-type solid-state image capturing apparatus, in which a charge detection section is shared by a plurality of pixel sections; and an electronic information device (e.g., digital camera (digital video camera, digital still camera), image input camera, scanner, facsimile, cell phone device equipped with camera and the like) using the amplification-type solid-state image capturing apparatus as an image input device for an image capturing section thereof, a phenomenon having a pattern of horizontal stripes at a cycle of the sharing number of pixel sections which conventionally occurs when strong incident light is received at photoelectric conversion elements is suppressed by adding an additional shutter operation at least either prior to an original shutter operation or subsequent to a reading operation. Therefore, it is possible to correctly read an original signal from the currently-read pixel section.

For example, when one of the plurality of pixel sections sharing the charge detection section performs an original shutter operation, an additional shutter operation is performed on the remaining pixel sections which share the charge detection section with the one pixel section and have not performed the original shutter operation yet. As such, when a subject having high luminance is captured, signal charge accumulated up to a saturation level at photoelectric conversion elements is discharged by the shutter operation and the additional shutter operation not only from the pixel section on which the original shutter operation is performed, but also from the pixel sections which have not performed the original shutter operation yet. Thus, the overflow of signal charge from the photoelectric conversion elements to the charge detection section can be suppressed. In this case, since the additional shutter operation is performed prior to the original shutter operation, this does not affect an optical charge accumulation period set by the original shutter operation and the reading operation.

In addition, when one of the plurality of pixel sections sharing the charge detection section performs a reading operation, an additional shutter operation is performed on the remaining pixel sections which share the charge detection section with the one pixel section and have previously performed the reading operation. As such, when a subject having high luminance is captured, signal charge again accumulated up to a saturation level at the photoelectric conversion elements is discharged by the additional shutter operation from the pixel sections which have previously performed the reading operation. Thus, the overflow of signal charge from the photoelectric conversion elements to the charge detection section can be suppressed. In this case, since the additional shutter operation is performed subsequent to the reading operation, this does not affect an optical charge accumulation period set by the original shutter operation and the reading operation.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An amplification-type solid-state image capturing apparatus comprising:
    a shutter control section; and
    a plurality of pixel sections each including a photoelectric conversion element for receiving light of a subject and performing a photoelectric conversion on the light of the subject and a transfer section operable to transfer signal charge from the photoelectric conversion element to a charge detection section, the plurality of pixel sections connected to each charge detection section, and the amplification-type solid-state image capturing apparatus amplifying and reading potential at the charge detection section as signal data for each of the pixel sections, wherein
    at least two of the plurality of pixel sections which share the charge detection section are configured to each perform one original shutter operation at different times during a shutter operation (S); and
    the shutter control section is configured to, in response to one pixel section performing an original shutter operation during the shutter operation (S), perform an additional shutter operation on the remaining pixel sections which share the charge detection section with the one pixel section and have not yet performed an original shutter operation during the shutter operation (S).

2. An amplification-type solid-state image capturing apparatus according to claim 1, wherein when another one of the plurality of pixel sections which share the charge detection section performs a reading operation,
    the shutter control section performs the additional shutter operation on the remaining pixel sections which share the charge detection section with the another one pixel section and have previously performed the reading operation.

3. An amplification-type solid-state image capturing apparatus according to claim 2, wherein a number of the plurality of pixel sections sharing the charge detection section is M (M is an integer greater than or equal to 2), and the shutter control section includes:
    (M−1) number of OR circuits A: an (i) th OR circuit A, to which shutter control signals are input, wherein each of the shutter control signals controls an original shutter operation of corresponding one of (i+1) pixel sections among the plurality of pixel sections sharing the charge detection section, and the original shutter operation of each of the (i+1) pixel sections is performed at an earlier time, wherein (i) is a series of integers from 1 to (M−2) inclusive, and an (M−1)th OR circuit A, to which shutter control signals are input, wherein each of the shutter control signals controls the original shutter operation of corresponding one of the plurality of pixel sections sharing the charge detection section;
    (M−2) number of OR circuits B: a (j) th OR circuit B, to which reading control signals are input, wherein each of the reading control signals controls a reading operation of corresponding one of (M−j) pixel sections among the plurality of pixel sections sharing the charge detection section, and the reading operation of each of the (M−j) pixel sections is performed at a later time, wherein (j) is an integer from 1 to (M−2) inclusive; and
    (M−1) number of OR circuits C: a first OR circuit C, to which a shutter control signal and an output signal from the first OR circuit B are input, wherein the shutter control signal controls an original shutter operation of a pixel section among the plurality of pixel sections sharing the charge detection section, and the original shutter operation of the pixel section is performed at the earliest time; a (k+1)th OR circuit C, to which an output signal from the (k)th OR circuit A and an output signal from the (k+1)th OR circuit B are input, wherein (k) is an integer from 1 to (M−3) inclusive; and an (M−1)th OR circuit C, to which an output signal from the (M−2)th OR circuit A and a reading control signal are input, wherein the reading control signal controls a reading operation of a pixel section among the plurality of pixel sections sharing the charge detection section, and the reading operation of the pixel section is performed at the latest time, wherein, in order to perform an additional shutter operation on the remaining pixel sections which share the charge detection section with the one pixel section and have not performed an original shutter operation, and in order to perform an additional shutter operation on the remaining pixel sections which share the charge detection section with the another one pixel section and have previously performed the reading operation, a pixel section, among the plurality of pixel sections sharing the charge detection section, which performs a reading operation at the (l)th earliest time is configured to receive an output signal from the (l)th OR circuit C, wherein (l) is an integer from 1 to (M−1) inclusive, and a pixel section, among the plurality of pixel sections sharing the charge detection section, which performs a reading operation at the latest time is supplied with an output signal from the (M−1)th OR circuit A.

4. An amplification-type solid-state image capturing apparatus according to claim 3, wherein a number of the plurality of pixel sections sharing the charge detection section is 4, and the shutter control section includes:

three OR circuits A: a first OR circuit A, to which shutter control signals are input, wherein each of the shutter control signals controls an original shutter operation of corresponding one of two pixel sections among the four pixel sections sharing the charge detection section, and the original shutter operation of each of the two pixel sections is performed at an earlier time; a second OR circuit A, to which shutter control signals are input, wherein each of the shutter control signals controls an original shutter operation of corresponding one of three pixel sections among the four pixel sections sharing the charge detection section, and the original shutter operation of each of the three pixel sections is performed at an earlier time; and a third OR circuit A, to which shutter control signals are input, wherein each of the shutter control signals controls an original shutter operation of corresponding one of the four pixel sections sharing the charge detection section;

two OR circuits B: a first OR circuit B, to which reading control signals are input, wherein each of the reading control signals controls a reading operation of corresponding one of three pixel sections among the four pixel sections sharing the charge detection section, and the reading operation of each of the three pixel sections is performed at a later time; and a second OR circuit B, to which reading control signals are input, wherein each of the reading control signals controls a reading operation of corresponding one of two pixel sections among the four pixel sections sharing the charge detection section, and the reading operation of each of the two pixels is performed at a later time; and three OR circuits C: a first OR circuit C, to which a shutter control signal and an output signal from the first OR circuit B are input, wherein the shutter control signal controls an original shutter operation of a pixel section among the four pixel sections sharing the charge detection section, and the original shutter operation of the pixel section is performed at the earliest time; a second OR circuit C, to which an output signal from the first OR circuit A and an output signal from the second OR circuit B are input; and a third OR circuit C, to which an output signal from the second OR circuit A and a reading control signal are input, wherein the reading control signal controls a reading operation of a pixel section among the four pixel sections sharing the charge detection section, and the reading operation of the pixel section is performed at the latest time, wherein, in order to perform an additional shutter operation on the remaining pixel sections which share the charge detection section with the one pixel section and have not performed an original shutter operation, and in order to perform an additional shutter operation on the remaining pixel sections which share the charge detection section with the another one pixel section and have previously performed the reading operation, a pixel section, among the four pixel sections sharing the charge detection section, which performs a reading operation at the earliest time is supplied with an output signal from the first OR circuit C, a pixel section, among the four pixel sections sharing the charge detection section, which performs a reading operation at the second earliest time is supplied with an output signal from the second OR circuit C, a pixel section, among the four pixel sections sharing the charge detection section, which performs a reading operation at the third earliest time is supplied with an output signal from the third OR circuit C, and a pixel section, among the four pixel sections sharing the charge detection section, which performs a reading operation at the latest time is supplied with an output signal from the third OR circuit A.

5. An electronic information device using an amplification-type solid-state image capturing apparatus according to claim 2 for an image capturing section thereof.

6. An amplification-type solid-state image capturing apparatus according to claim 1, wherein the start of an optical charge accumulation period of each of the pixel sections is set by the original shutter operation, and the end of the optical charge accumulation period of each of the pixel sections is set by the reading operation.

7. An amplification-type solid-state image capturing apparatus according to claim 6, wherein a number of the plurality of pixel sections which share the charge detection section is N (N is an integer greater than or equal to 2), and the optical charge accumulation period is less than or equal to (N−1) of a multiple of a horizontal scan period.

8. An amplification-type solid-state image capturing apparatus according to claim 1, wherein a reset section for resetting the potential at the charge detection section when the signal data is read, and an amplification section for amplifying the potential at the charge detection section are provided for each charge detection section.

9. An amplification-type solid-state image capturing apparatus according to claim 8, wherein the reset section is a depression-type transistor.

10. An amplification-type solid-state image capturing apparatus according to claim 8, wherein the transfer section and the amplification section are each an enhancement-type transistor.

11. An amplification-type solid-state image capturing apparatus according to claim 8, wherein a selection section for selectively reading an output from the amplification section as the signal data to a reading signal line is provided between the amplification section and the reading signal line or provided between the amplification section and a power supply.

12. An amplification-type solid-state image capturing apparatus according to claim 1, wherein the photoelectric conversion element is an embedded photodiode.

13. An amplification-type solid-state image capturing apparatus according to claim 1, wherein the charge detection section is commonly connected to two to four pixel sections arranged to be adjacent to each other in a vertical direction.

14. An amplification-type solid-state image capturing apparatus according to claim 1, wherein a number of the plurality of pixel sections sharing the charge detection section is M (M is an integer greater than or equal to 2), and the shutter control section includes (M−1) number of OR circuits: an (i)th OR circuit A, to which shutter control signals are input, wherein each of the shutter control signals controls an original shutter operation of corresponding one of (i+1) pixel sections among the plurality of pixel sections sharing the charge detection section, and the original shutter operation of each of the (i+1) pixel sections is performed at an earlier time, wherein (i) is a series of integers from 1 to (M−2) inclusive, and an (M−1)th OR circuit A, to which shutter control signals are input, wherein each of the shutter control signals controls an original shutter operation of corresponding one of the plurality of pixel sections sharing the charge detection section, and
wherein, in order to perform an additional shutter operation on the remaining pixel sections which share the charge detection section with the one pixel section and have not performed an original shutter operation, a pixel section, among the plurality of pixel sections sharing the charge detection section, which performs an original shutter operation at the earliest time is configured to receive a shutter control signal for controlling a shutter period of the pixel section, and a pixel section, among the plurality of pixel sections sharing the charge detection section, which performs an original shutter operation at the (j+1)th earliest time is configured to receive an output signal from the (j)th OR circuit A, wherein (j) is an integer from 1 to (M−1) inclusive.

15. An amplification-type solid-state image capturing apparatus according to claim 14, wherein a number of the plurality of pixel sections sharing the charge detection section is 4, and the shutter control section includes:
three OR circuits A: a first OR circuit A, to which shutter control signals are input, wherein each of the shutter control signals controls an original shutter operation of corresponding one of two pixel sections among the four pixel sections sharing the charge detection section, and the original shutter operation of each of the two pixel sections is performed at an earlier time; a second OR circuit A, to which shutter control signals are input, wherein each of the shutter control signals controls an original shutter operation of corresponding one of three pixel sections among the four pixel sections sharing the charge detection section, and the original shutter operation of each of the three pixel sections is performed at an earlier time; and a third OR circuit A, to which shutter control signals are input, wherein each of the shutter control signals controls an original shutter operation of corresponding one of the four pixel sections sharing the charge detection section,
wherein, in order to perform an additional shutter operation on the remaining pixel sections which share the charge detection section with the one pixel section and have not performed an original shutter operation, a pixel section, among the four pixel sections sharing the charge detection section, which performs an original shutter operation at the earliest time is supplied with a shutter control signal for controlling a shutter period of the pixel section, a pixel section, among the four pixel sections sharing the charge detection section, which performs an original shutter operation at the second earliest time is supplied with an output signal from the first OR circuit A, a pixel section, among the four pixel sections sharing the charge detection section, which performs an original shutter operation at the third earliest time is supplied with an output signal from the second OR circuit A, and a pixel section, among the four pixel sections sharing the charge detection section, which performs an original shutter operation at the latest time is supplied with an output signal from the third OR circuit A.

16. An electronic information device using an amplification-type solid-state image capturing apparatus according to claim 1 for an image capturing section thereof.

17. An amplification-type solid-state image capturing apparatus comprising:
a shutter control section; and
a plurality of pixel sections each including a photoelectric conversion element for receiving light of a subject and performing a photoelectric conversion on the light of the subject and a transfer section operable to transfer signal charge from the photoelectric conversion element to a charge detection section, the plurality of pixel sections connected to each charge detection section, and the amplification-type solid-state image capturing apparatus amplifying and reading potential at the charge detection section as signal data for each of the pixel sections, wherein
at least two of the plurality of pixel sections which share the charge detection section are configured to each perform one reading operation at different times during a reading operation (R); and
the shutter control section is configured to, in response to one pixel section performing a reading operation during the reading operation (R), perform an additional shutter operation on pixel sections which share the charge detection section with the one pixel section and have previously performed a reading operation during the reading operation (R),
wherein the additional shutter operation is different from an original shutter operation for instructing the start of an optical charge accumulation period of the photoelectric conversion element.

18. An amplification-type solid-state image capturing apparatus according to claim 17, wherein the start of an optical charge accumulation period of each of the pixel sections is set by the original shutter operation, and the end of the optical charge accumulation period of each of the pixel sections is set by the reading operation.

19. An amplification-type solid-state image capturing apparatus according to claim 18, wherein a number of the plurality of pixel sections which share the charge detection section is N (N is an integer greater than or equal to 2), and the optical charge accumulation period is less than or equal to (N−1) of a multiple of a horizontal scan period.

20. An amplification-type solid-state image capturing apparatus according to claim 17, wherein a reset section for resetting the potential at the charge detection section when the signal data is read, and an amplification section for amplifying the potential at the charge detection section are provided for each charge detection section.

21. An amplification-type solid-state image capturing apparatus according to claim 20, wherein the reset section is a depression-type transistor.

22. An amplification-type solid-state image capturing apparatus according to claim 20, wherein the transfer section and the amplification section are each an enhancement-type transistor.

23. An amplification-type solid-state image capturing apparatus according to claim 20, wherein a selection section for selectively reading an output from the amplification section as the signal data to a reading signal line is provided between the amplification section and the reading signal line or provided between the amplification section and a power supply.

24. An amplification-type solid-state image capturing apparatus according to claim 17, wherein the photoelectric conversion element is an embedded photodiode.

25. An amplification-type solid-state image capturing apparatus according to claim 17, wherein the charge detection section is commonly connected to two to four pixel sections arranged to be adjacent to each other in a vertical direction.

26. An amplification-type solid-state image capturing apparatus according to claim 17, wherein a number of the plurality of pixel sections sharing the charge detection section is M (M is an integer greater than or equal to 2), and the shutter control section includes:
(M−2) number of OR circuits B: an (i) th OR circuit B, to which reading control signals are input, wherein each of the reading control signals controls a reading operation of corresponding one of (M−i) pixel sections among the plurality of pixel sections sharing the charge detection section, and the reading operation of each of the (M−i) pixel sections is performed at a later time, wherein (i) is an integer from 1 to (M−2) inclusive;
wherein, in order to perform an additional shutter operation on the remaining pixel sections which share the charge detection section with the another one pixel section and have previously performed the reading operation, a pixel section, among the plurality of pixel sections sharing the charge detection section, which performs a reading operation at the (j) th earliest time is supplied with an output signal from the (j) th OR circuit B, wherein (j) is an integer from 1 to (M−2) inclusive, and a pixel section, among the plurality of pixel sections sharing the charge detection section, which performs a reading operation at the (M−1)th earliest time is supplied with a reading control signal for controlling a pixel section that performs a reading operation at the latest time.

27. An amplification-type solid-state image capturing apparatus according to claim 26, wherein a number of the plurality of pixel sections sharing the charge detection section is 4, and the shutter control section includes:
two OR circuits B: a first OR circuit B, to which reading control signals are input, wherein each of the reading control signals controls a reading operation of corresponding one of three pixel sections among the four pixel sections sharing the charge detection section, and the reading operation of each of the three pixels is performed at a later time; and a second OR circuit B, to which reading control signals are input, wherein each of the reading control signals controls a reading operation of corresponding one of two pixel sections among the four pixel sections sharing the charge detection section, and the reading operation of each of the two pixel sections is performed at a later time; and
wherein, in order to perform an additional shutter operation on the remaining pixel sections which share the charge detection section with the another one pixel section and have previously performed the reading operation, a pixel section, among the four pixel sections sharing the charge detection section, which performs a reading operation at the earliest time is supplied with an output signal from the first OR circuit B, a pixel section, among the four pixel sections sharing the charge detection section, which performs a reading operation at the second earliest time is supplied with an output signal from the second OR circuit B, and a pixel section, among the four pixel sections sharing the charge detection section, which performs a reading operation at the third earliest time is supplied with a reading control signal for controlling a pixel section that performs a reading operation at the latest time.

28. An electronic information device using an amplification-type solid-state image capturing apparatus according to claim 17 for an image capturing section thereof.

* * * * *